United States Patent

Shirai et al.

[11] Patent Number: 5,912,877
[45] Date of Patent: Jun. 15, 1999

[54] DATA EXCHANGE, DATA TERMINAL ACCOMMODATED IN THE SAME, DATA COMMUNICATION SYSTEM AND DATA COMMUNICATION METHOD

[75] Inventors: Nobuo Shirai; Hiroyuki Kurisutani; Yukio Sone, all of Kawasaki, Japan

[73] Assignee: Fujitsu Limited, Kanagawa, Japan

[21] Appl. No.: 08/555,321

[22] Filed: Nov. 8, 1995

[30] Foreign Application Priority Data

Dec. 7, 1994 [JP] Japan ..................................... 6-304074

[51] Int. Cl.[6] .................................. H04J 3/14; H04L 1/22
[52] U.S. Cl. ............................................ 370/228; 370/237
[58] Field of Search ..................................... 370/237, 217, 370/218, 225, 228, 235, 252

[56] References Cited

U.S. PATENT DOCUMENTS

| | | | |
|---|---|---|---|
| 5,253,248 | 10/1993 | Dravida et al. | 370/237 |
| 5,343,465 | 8/1994 | Khalil | 370/232 |
| 5,483,519 | 1/1996 | Satomi et al. | 370/228 |
| 5,502,712 | 3/1996 | Akita | 370/225 |
| 5,581,542 | 12/1996 | Kato et al. | 370/219 |

FOREIGN PATENT DOCUMENTS

| | | |
|---|---|---|
| 58151747 | 9/1983 | Japan . |
| 6175648 | 4/1986 | Japan . |
| 4180442 | 6/1992 | Japan . |

*Primary Examiner*—Min Jung
*Attorney, Agent, or Firm*—Helfgott & Karas, PC

[57] ABSTRACT

The present invention relates to a data exchange and a data exchanging method each suitable for a communication system which tends to be congested due to high-speed communication such as a frame relay network. The data exchange that accommodates plural data terminals via terminal trunks includes a congestion status detecting unit for detecting the congestion status in a standard transit trunk, and the transit trunk control unit including a first alternate control unit that controls to transfer data to be transferred by a roundabout route using a backup transit trunk, based on detection information from the congestion status detecting unit. The purpose of the present invention is to suppress the occurrence of congestion or the frame disposal of a frame at a congestion occurrence time.

29 Claims, 40 Drawing Sheets

TERMINAL TRUNK FRAME

FIG. 10

| TO NODE B | GROUP 1 ATTRIBUTE: EXPEDITED | | GROUP 2 ATTRIBUTE: EXPEDITED | | GROUP 3 ATTRIBUTE: NOT EXPEDITED | |
|---|---|---|---|---|---|---|
| | FIRST ROUTE | SECOND ROUTE | FIRST ROUTE | SECOND ROUTE | FIRST ROUTE | SECOND ROUTE |
| | 13a | 14 | 13b | 14 | 13a | 13b |

ALTERNATE ATTRIBUTE
MANAGEMENT TABLE

SEARCH WITH ROUTE No. AND GROUP No.

41b

| |
|---|
| ROUTE No. 1 |
| GROUP No. 1 |
| EXPEDITED |
| DLC1～16～20 |
| GROUP No. 2 |
| NOT-EXPEDITED |
| DLC1～21～30 |
| |

FIG. 15

| NODE No. | FIRST ROUTE | SECOND ROUTE | | |
|---|---|---|---|---|
| | | TERMINAL GROUP 15-1 | TERMINAL GROUP 15-2 | TERMINAL GROUP 15-3 |
| | 1 | 1 | 2 | 3 |

41c

SEARCH WITH DESTINATION NODE No. → ROUTING DATA

FIG. 39

| EACH STATE | FRAME RELAY STATUS I | | FRAME RELAY STATUS II | | FRAME RELAY STATUS III | |
|---|---|---|---|---|---|---|
| | X.25 BAND VALUE | FR BAND VALUE | X.25 BAND VALUE | FR BAND VALUE | X.25 BAND VALUE | FR BAND VALUE |
| X.25 STATUS I | X.25 BAND VALUE | FR BAND VALUE | X.25 BAND VALUE | FR BAND VALUE | X.25 BAND VALUE | FR BAND VALUE |
| X.25 STATUS II | X.25 BAND VALUE | FR BAND VALUE | X.25 BAND VALUE | FR BAND VALUE | X.25 BAND VALUE | FR BAND VALUE |
| X.25 STATUS III | X.25 BAND VALUE | FR BAND VALUE | X.25 BAND VALUE | FR BAND VALUE | X.25 BAND VALUE | FR BAND VALUE |

FIG.42
PRIOR ART

NODE A ROUTING TABLE

| REMOTE OFFICE | OUTPUT ROUTE | |
|---|---|---|
| | FIRST | SECOND |
| 103B | 104a | 104b |
| 103C | 104b | 104a |

108

DATA EXCHANGE, DATA TERMINAL ACCOMMODATED IN THE SAME, DATA COMMUNICATION SYSTEM AND DATA COMMUNICATION METHOD

BACKGROUND OF THE INVENTION

1) Field of the Invention

The present invention relates to a data exchange, a data terminal accommodated in the data exchange, data communication system, and a data communicating method, each suitable for communication systems which tend to be involved in congestion in the high-speed communication such as frame relay networks.

2) Description of the Related Art

Recently, with the introduction of ISDN (Integrated Services Digital Network) or the ITU-T Recommendation, the technology using as a data communication system the frame relay communication system or the packet exchange system has been developed vigorously for variable-length data communications.

In the general packet switching system, the terminal executes a sequential correction or retransmission control with X.25 protocol at an error detecting time while the transit trunk executes a sequential correction or retransmission control with X.75 protocol or datagram control at an error detecting time. Because the packet switching system is utilized at a relatively low communication rate, distributing network resources to each terminal trunk has been inflexibly designed in consideration of only a network configuration time.

The network (frame relay network) adopting the frame relay communication method differs from the X.25/X.75 protocol in the packet network in that the frame discard is permitted for expectation of retransmission from a terminal and the frame discard is performed at the reverse time without performing the sequential correction.

For that reason, the frame relay network enables high-speed communications due to high-speed throughput but tends to be congested. As a result, it is needed to recognize always the status of the load to the communication network and to ensure automatically the most suitable alternate route at a load distribution or congestion occurrence time.

For example, FIG. 41 is a diagram showing a general frame relay network with an alternate circuit. Referring to FIG. 41, numerals 101 and 102 represent frame relay terminals, and 100 represents a frame relay network formed of nodes 103A to 103C. The frame transfer is performed between the frame relay terminals 101 and 102 via the frame relay network 100.

In the frame relay network 100, the nose 103A is connected to the node 103B via the route 104a and to the node 103C via the route 104b. The node 103B is connected to the node 103C via the route 104c.

In order to transmit a frame from the frame relay terminal 101 to the frame relay terminal 102, the node 103A included in the frame relay terminal 101 includes a routing table 108 in which two kinds of routes are decided according to the destination node, as shown in FIG. 42.

When the frame relay terminal 101 transmits a frame to the frame relay terminal 102, the node 103 A first selects the first route 104b to the node 103C acting as a destination node, according to the routing table 108.

If congestion occurs in the first route 104b, the second route 104a is selected. When the congestion is removed in the first route 104b, the route is switched back from the second route 104a to the original first route 104b to perform the frame transfer.

In the general frame relay communication system shown in FIG. 43, the frame relay exchange 103 on the transmitting side includes a high-speed (~1.5 Mbps) frame relay terminal 101 and a low-speed (~19.2 Kbps) X.25 terminal 105.

The frame relay communication system shown in FIG. 43 permits the X.25 system communication and brings a packet from the X.25 terminal 105 at a high speed via the frame relay transit trunk 106.

However, in the general frame relay network shown in FIG. 41, when the first route 104b and the second route 104a are alternately selected due to the congestion occurrence/congestion removal, the order of original frames sent from the frame relay terminal 101 may be reversed in the destination node 103C. The reversely ordered frame is discarded in the destination node 103C. Hence there are problems in that the congestion occurrence or the frame discard at a congestion occurrence time cannot be sufficiently suppressed to improve the frame transfer efficiency and transfer rate.

Furthermore, in the frame relay communication system shown in FIG. 43, since the transmission queue 107 of the frame relay transit trunk does not have any distinction between the X.25 system and the frame relay system, the communication load from the frame relay terminal whose a subscriber trunk is high-speed greatly affects the delay in the X.25 (packet) communication by the X.25 terminal 105.

SUMMARY OF THE INVENTION

The present invention is made to overcome the above mentioned problems. An object of the present invention is to provide a data exchange that can suppress a congestion occurrence and a frame discard at a congestion occurrence time, in the frame relay networks.

Another object of the present invention is to provide a data terminal, accommodated in a data exchange, that can suppress a congestion occurrence and a frame discard at a congestion occurrence time, in the frame relay networks.

Still another object of the present invention is to provide a data communication system that can suppress a congestion occurrence and a frame discard at a congestion occurrence time, in the frame relay networks.

Further object of the present invention is to provide a data communicating method that can suppress a congestion occurrence and a frame discard at a congestion occurrence time, in the frame relay networks.

In order to achieve the above objects, according to the present invention, the data exchange accommodating plural data terminals via terminal trunks and including transit trunk control means for transferring selectively data to be transferred from the terminal trunk to a standard transit trunk or a backup transit trunk, the transit trunk control means connected to the standard transit trunk transferring data to a predetermined transfer destination in a transit system, and the backup transit trunk which transfers alternately data to be transferred to the predetermined transfer destination using the standard transit trunk, is characterized by congestion status detecting means for detecting a congestion status in the standard transit trunk; and the transit trunk control means having first alternate control means for controlling to transfer alternately data to be transferred using the backup transit trunk, based on detection information from congestion status detecting means.

According to the data exchange of the present invention, the transit trunk control means controls to perform an alternate transfer of data to be transferred using a backup transit trunk, based on detection information from the congestion status detecting means, thus decreasing the load of the standard transit trunk. Hence, there is an advantage in that since the congestion can be urged to shift to the normal status, communications from the data terminal can be guaranteed.

According to the present invention, the data exchange accommodating plural data terminals via terminal trunks and connected to plural standard transit trunks transferring data to a predetermined transfer destination in a transit system, and a backup transit trunk transferring alternately data to be transferred to the predetermined transfer destination using the standard transit trunk, is characterized by data link identification information setting means for setting data link identification information corresponding to data link identification information set every terminal trunk, to the plural standard transit trunks; congestion status detecting means for detecting the congestion status in the standard transit trunk; and transit trunk control means for controlling to transfer data to be transferred from the terminal trunk using a standard transit trunk corresponding to data link identification information, and controlling to transfer data using a standard transit trunk to which another data link identification information is set when congestion occurring in the standard transit trunk is detected based on detection information from the congestion status detecting means.

According to the data exchange of the present invention, when it is detected that congestion has occurred in the standard transit trunk, based on detection information from the congestion status detecting means, the transit trunk control means controls to transfer data using a standard transit trunk to which another data link identification information is set. Thus only the frame sent from a terminal with a large communication load can be by-passed. Hence, there is an advantage in that communications can be subjected to a flow control without influencing another communications.

Furthermore, according to the present invention, the data terminal accommodated in a data exchange via a terminal trunk,, is characterized by a standard transit trunk for transferring data to a predetermined transfer destination in a transit system; backup transit trunk for transferring data to be transferred with the standard transit trunk to the predetermined transfer destination by a roundabout route; transit trunk control means for transferring selectively data to be transferred from a terminal trunk via the standard transit trunk or the backup transit trunk; flow parameter setting means for setting a flow parameter to perform a flow control in the transit system; flow parameter reporting means for reporting the changed flow parameter to the variable-length data terminal when the flow parameter setting means changes the flow parameter; and flow control means for performing a flow control according to a flow parameter reported from the flow parameter reporting means.

Hence, the data terminal according to the present invention has the advantage in that since the flow parameter reporting means reports a flow parameter to a variable-length data terminal, the throughput can be utilized to its maximum.

According to the present invention, the data communication system is characterized by a transmitting data exchange accommodating a transmitting data terminal via a terminal trunk, for exchanging data; and a receiving data exchange accommodating a receiving data terminal via a terminal trunk, for exchanging data; the transmitting data exchange being connected to the receiving data exchange via a standard transit trunk for transferring data to a predetermined transfer destination in a transit system and a backup transit trunk for transferring data to be transferred with the standard transit trunk to the predetermined transfer destination by a roundabout route; the transmitting data exchange including transit trunk control means for transferring selectively data to be transferred from the terminal trunk to the standard transit trunk or the backup transit trunk, and congestion status detecting means for detecting the congestion status of the standard transit trunk; the transit trunk control means includes first alternate control means for controlling to transfer the data to be transferred by a roundabout route using the backup transit trunk, based on the detection information from the congestion status detecting means.

According to the data communication system of the present invention, the transit trunk control means can decrease the load of the standard transit trunk by controllably bypassing data to be transferred using the backup transit trunk. Hence there is an advantage in that since a shift from a congestion to the normal status can be accelerated, communications from the variable-length data terminal can be guaranteed.

Moreover, according to the present invention, the data communicating method in which a transmitting data exchange accommodating a transmitting data terminal via a terminal trunk, for exchanging data and a receiving data exchange accommodating a receiving data terminal via the terminal trunk, for exchanging data are prepared; the transmitting data exchange transferring data to the receiving data exchange, using a standard transit trunk being transferable data to a predetermined transfer destination in a transit system or a backup transit trunk transferring data to be transferred with the standard transit trunk to the predetermined transfer destination by a roundabout route; wherein the transmitting data exchange transfers selectively data to be transferred from the terminal trunk to the standard transit trunk or the backup transit trunk, detects the congestion status in the transit trunk 3, and transfers data to be transferred using the backup transit trunk, by a roundabout route, based on the detection information of the congestion status.

According to the variable-length data communicating method of the present invention, the transmitting data exchange can decrease the load of the standard transit trunk by controllably alternate-transferring data to be transferred using a backup transit trunk, based on the detection information from the congestion status detecting means. Hence there is an advantage in that since a shift from congestion to the normal status can be accelerated, communications from the data terminal can be guaranteed.

BRIEF DESCRIPTION OF THE DRAWINGS

FIG. 10 is a diagram showing a routing table used for a frame relay in the present embodiment of the present invention;

FIG. 11 is a diagram showing an alternate attribute management table used for performing a frame relaying operation in the present embodiment of the present invention;

FIG. 15 is a diagram showing a routing table according to an embodiment of the present invention;

FIG. 39 is a diagram showing a table used for changing the band, according to the present embodiment;

FIG. 42 is a diagram showing a routing table in which the route is decided according to a destination node.

DESCRIPTION OF THE PREFERRED EMBODIMENTS (a) Aspect of the Invention:

First the aspect of the present invention will be explained below with reference to the attached drawings.

Figure 1:
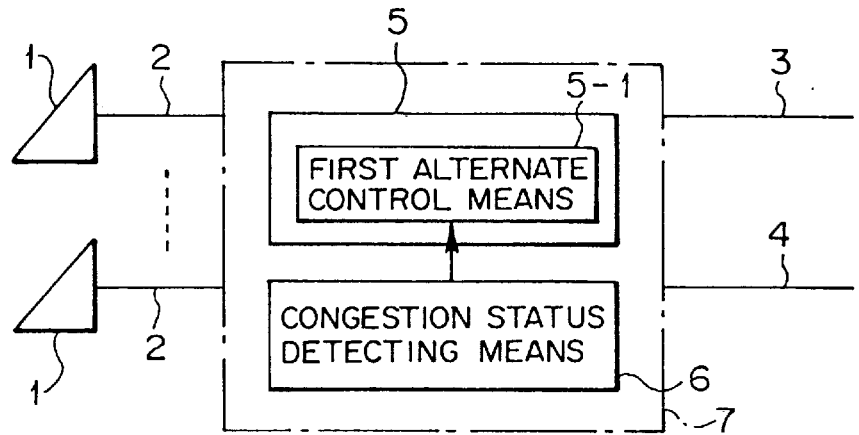
FIG. 1 is a block diagram showing a first aspect of the present invention.

FIG. 1 is a block diagram showing the first aspect of the present invention. Referring to FIG. 1, numeral 7 represents a data exchange. The data exchange 7 accommodates plural data terminals 1 via the terminal trunks 2. The data exchange 7 is connected to a standard transit line 3 that transfers data to a predetermined transfer destination in a transit system and a backup transit line 4 that detours data to be transferred with the standard transit line 3 to the predetermined transfer destination. The data exchange 7 includes transit trunk control means 5 and congestion status detecting means 6.

The transit trunk control means 5 transfers selectively data to be transferred from the terminal trunk 2 to the standard transit line 3 or the backup transit line 4. The congestion status detecting means 6 detects the congestion status of the standard transit line 3.

The transit trunk control means 5 includes first alternate control means 5-1 that controls the backup transit line 4 to detour data to be transferred, based on the detection information from the congestion status detecting means 6.

The data exchange 7 also includes an alternate priority setting means that sets the priority of the data link identification information set every terminal trunk 2. The alternate control to the backup transit line 4 under the first alternate control means 5-1 is performed based on the priority set by the alternate priority setting means.

Plural data terminals 1 are formed as at least one group. The alternate priority setting means can set the priority to the data link identification information set every terminal trunk 2 of each group.

Plural backup transit lines 4 are connected to the data exchange 7. The transit trunk control means 5 may include second alternate control means that stepwise-detours data to be transferred with the standard transit line 3 in use to plural backup transit lines 4, based on the detection information from the congestion status detecting means 6.

In this case, the data exchange 7 includes trunk use-rate monitoring means that monitors a trunk use-rate. The transit trunk control means 5 includes return transferring means that transfers data by switching sequentially to the original standard transit line 3 with the trunk use-rate of a smaller value than a predetermined value, based on the trunk use-rate information from the trunk use-rate monitoring means when the congestion status detecting means 6 detects that the standard transit line 3 has been released from its congestion. The transit trunk control means 5 also includes committed information rate varying means that varies committed information rate defined by the terminal trunk 2 when it is judged that the standard transit line 3 is nearly in the congestion status, based on the detection information from the congestion status detecting means 6.

The data exchange 7 includes flow parameter setting means that sets a flow parameter to perform a flow control in the transit system, and flow parameter reporting means that reports the varied flow parameter to the variable-length data terminal 1 when the flow parameter setting means varies a flow parameter.

In the data exchange according to the present invention shown in FIG. 1, the transit trunk control means 5 transfers data to be transferred from the terminal trunk 2 to the standard transit line 3 or the backup transit line 4, thus transferring data from the data terminal 1 to a predetermined transfer destination.

The congestion status detecting means 6 detects the congestion status of the standard transit line 3. The first alternate control means 5-1 in the transit trunk control means 5 detours data to be transferred using the backup transit line 4, based on the detection information from the congestion status detecting means 6.

The alternate priority setting means sets the priority to the data link identification information set every terminal trunk 2. The first alternate control means 5-1 can perform an alternate control to the backup transit line 4, based on the priority set in the alternate priority setting means.

Where plural data terminals 1 are formed as at least one group, the alternate priority setting means can set the priority to the data link identification information set every terminal trunk 2 of each group.

The second alternate control means in the transit trunk control means 5 can stepwise-detour data to be transferred with the standard transit line 3 in use to plural backup transit lines 4, based on the detection information from the congestion status detecting means 6.

In this case, the trunk use-rate monitoring means monitors the trunk use-rate. When the congestion status detecting means 6 detects that the standard transit line 3 has been released from the congestion status, the return transferring means in the transit trunk control means 5 can transfer data by returning sequentially to the original standard transit line 3 with the trunk use-rate of a smaller value than a predetermined value, based on the trunk use-rate information from the trunk use-rate monitoring means.

The committed information rate varying means can vary the committed information rate defined in the terminal trunk 2 when it is judged that the standard transit line 3 is nearly in the congestion status, based on the detection information from the congestion status detecting means 6.

When the flow parameter setting means varies a flow parameter to perform a flow control in the transit system, the flow parameter reporting means can report the varied flow parameter to the data terminal 1.

According to the data exchange of the present invention, the transit trunk control means 5 controls the backup transit line 4 to detour data to be transferred based on the detection information from the congestion status detecting means 6, thus reducing the load to the standard transit line 3. Hence there is an advantage in that the congestion can be shifted to the normal state, whereby communications from the data terminals can be guaranteed.

According to the present invention, grouping plural data terminals 1 allows an alternate transfer process. Hence there is an advantage in that the trunk can be shifted from the congestion status to the normal state.

According to the present invention, the transit trunk control means 5 includes the second alternate control means that stepwise-detours data to be transferred with the standard transit line 3 in use to plural backup transit lines 4, based on the detection information from the congestion status detecting means 6. Hence there is an advantage in that since the backup transit line 4 is effectively used, the communication efficiency can be improved.

According to the present invention, when the congestion of the standard transit line 3 is removed, the backup transit lines 4 can be switched back sequentially, whereby the waste use of the backup transit lines 4 can be avoided. Hence there is an advantage in that communications is established using effectively the standard transit lines 3.

According to the present invention, when it is judged that the standard transit line 3 is nearly in the congestion status, the committed information rate varying means varies the committed information rate defined with the terminal trunk 2. Hence there is an advantage in that the terminal trunk 2 can be effectively used.

Furthermore, according to the present invention, there is an advantage in that the throughput can be fully conjugated by reporting the flow parameter to the variable-length data terminal 1 by means of the flow parameter reporting means.

Figure 2:
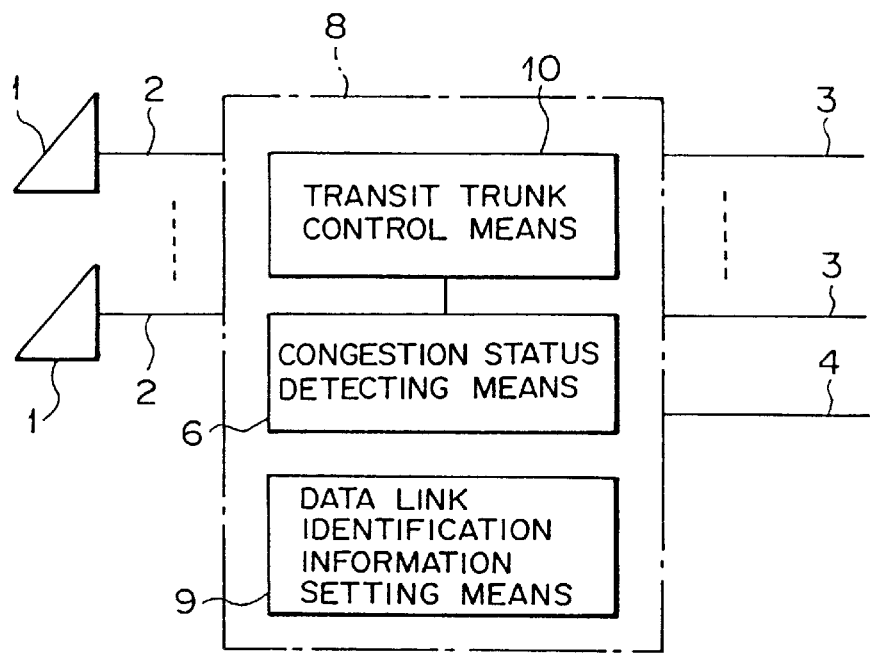
FIG. 2 is a block diagram showing a second aspect of the present invention.

FIG. 2 is a block diagram showing the second aspect of the present invention. Referring to FIG. 2, numeral 8 represents a data exchange. The data exchange 8 includes plural data terminals 1 via terminal trunks 2. The data exchange 8 is connected to plural standard transit line 3 each of which transfers data to a predetermined transfer destination in a transit system, and a backup transit line 4 which detours data to be transferred with the standard transit line 3 to the predetermined transfer destination. The data exchange 8 includes data link identification information setting means 9 and congestion state detecting means 6.

The data link identification information setting means 9 sets the data link identification information corresponding to the data link identification information set every terminal trunk 2 to plural standard transit lines 3. The congestion status detecting means 6 detects the congestion status in the standard transit line 3.

Furthermore, numeral 10 represents transit trunk control means. The transit trunk control means 10 controls transferring data to be transferred from the terminal trunk 2 using the standard transit line 3 corresponding to the data link identification information and transferring data using the standard transit line 3 to which another data link identification information is set when congestion is detected in the standard transit line 3, based on the detection information from the congestion status detecting means 6.

The data exchange shown in FIG. 1 or 2 can include trunk use-rate monitoring means that monitors the trunk use rate. The transit trunk control means 5 or 10 includes the return transferring means that returns the trunk to the original standard transit line 3 to transfer data when the congestion status detecting means 6 detects a release from the congestion status of the standard transit line 3, provided that the trunk use-rate has a smaller value than a predetermined value, based on information regarding a trunk use-rate from the trunk use-rate monitoring means.

The data exchange 8 shown in FIG. 2 includes trunk use-rate monitoring means that monitors the trunk use-rate. When it is detected that congestion occurs in the standard transit line 3, the transit trunk control means 10 can control the data transfer using the standard transit line 3 with the smallest trunk use-rate, based on the information regarding a trunk use-rate from the trunk use-rate monitoring means.

In the data exchange shown in FIG. 1 or 2, the standard transit lines 3 are used for communications, with the band separated into the packet system and the band separated into the frame relay system. In this case, the data exchange includes transmission queue monitoring means that monitors the transmission queues in the packet system and the frame relay system. The transit trunk control means 5 includes band ratio varying means that varies the band ratio of the band in the packet system and the band in the frame relay system, based on the transmission queue monitoring information from the transmission queue monitoring means.

The transmission queue monitoring information from the transmission queue monitoring means can be information regarding congestion of a transmission queue or information regarding a delay of a transmission queue.

In the data exchange shown in FIG. 2, the data link identification information setting means 9 sets data link identification information corresponding to the data link identification information set every terminal trunk 2 to plural standard transit lines 3. The congestion status detecting means 6 detects the congestion status of the standard transit line 3.

The transit trunk control means 10 controls data to be transferred from the terminal trunk 2 to transfer using the standard transit line 3 corresponding to the data link identification information, and transfer using the standard transit line 3 to which another data link identification information is set when occurrence of congestion in the standard transit line 3 is detected based on the detection information from the congestion status detecting means 6.

In the data exchange shown in FIG. 1 or 2, since the trunk use-rate monitoring means monitors the trunk use-rate, the return transferring means in the transit trunk control means 5 or 10 switches back the line to the original standard transit line 3 to transfer data when the congestion status detecting means 6 detects the release from the congestion status of the standard transit line 3, provided that the trunk use-rate has a smaller value than a predetermined value, based on the trunk use-rate information from the trunk use-rate monitoring means.

In the data exchange 8 shown in FIG. 2, when the trunk use-rate monitoring means monitors the trunk use-rate and detects that congestion occurs in the standard transit line 3, the transit trunk control means 10 can control a data transfer using the standard transit line 3 with the smallest trunk use-rate, based on the trunk use-rate information from the trunk use-rate monitoring means.

In the data exchange shown in FIG. 1 or 2, communications can be established with the standard transit line 3 separated into the band in a packet system and the band in a frame relay system. In this case, the transmission queue monitoring means monitors transmission queues in a packet system and a frame relay system. The band ratio varying means in the transit trunk control means 5 can vary the ratio of the band in the packet system and the band in the frame relay system, based on the transmission queue monitoring information from the transmission queue monitoring means.

The transmission queue monitoring information from the transmission queue monitoring means may be the transmission queue congestion information or transmission queue delay information.

According to the variable-length data exchange, the transit trunk control means 10 can control data transfer using the standard transit line 3 to which another data link identification information is set when the occurrence of the congestion in the standard transit line 3 is detected based on the detection information from the congestion status detecting means 6. Hence there is an advantage in that only the frame sent from the terminal with large communication load can be bypassed so that the communication flow control can be performed without influencing other communications.

Furthermore, according to the present invention, when the data returning means releases the congestion status of the standard transit line 3, the line is switched back to the standard transit line 3 after the trunk use-rate becomes sufficiently small. Even if the line is returned or switched back from the alternate line to the standard transit line 3, the possibility that congestion occurs in the standard transit line 3 is small. Hence there is an advantage in that the frame loss due to repeated congestion can be suppressed to a minimum.

According to the present invention, the transit trunk control means 10 controls a data transfer using the standard transit line 3 with the smallest trunk use-rate, based on the trunk use-rate information from the trunk use-rate monitoring means. When a standard transit line 3 is congested, the alternate transfer process is executed using another standard transit line 3 with the smallest trunk use-rate. Hence there is an advantage in that the flow can be increased to the maximum by distributing the traffic in the transit network so that the communication efficiency can be improved.

Moreover, according to the present invention, since the communication is made with the standard transit lines 3 separated into the band in the packet system and the band in the frame relay system, the delay in the packet communication can be suppressed.

According to the present invention, there is a advantage in that since the communication band of the standard transit line 3 can be decided according to congestion information or delay information of each transmission queue, it can be suppressed that congestion occurs simultaneously in the packet system and the frame relay system.

The data terminal connected to the data exchange according to the present invention is characterized by the flow control means that performs a flow control according to the flow parameter reported from the flow parameter reporting means.

In the data terminal 1 connected to the data exchange 7, the flow control means executes a flow control according to the flow parameter reported from the flow parameter reporting means.

Hence according to the data terminal of the present invention, there is an advantage in that the throughput can be conjugated to its maximum by reporting the flow parameter from the flow parameter reporting means to the data terminal 1.

According to the data communication system of the present invention, the data communication system consists of a transmitting data exchange accommodating a transmitting data terminal via a terminal trunk 2, for exchanging data; and a receiving data exchange accommodating a receiving data terminal via a terminal trunk 2, for exchanging data, the transmitting data exchange being connected to the receiving variable-length data exchange via a standard transit line 3 for transferring data to a predetermined transfer destination in a transit system and a backup transit line 4 for transferring data to be transferred with the standard transit line 3 to the predetermined transfer destination by a roundabout route. The transmitting data exchange includes transit trunk control means for transferring selectively data to be transferred from the terminal trunk 2 to the standard transit line 3 or the backup transit line 4, and congestion status detecting means for detecting the congestion status of the standard transit line 3. The transit trunk control means includes first alternate control means for controlling an alternate transfer of the data to be transferred using the backup transit line 4, based on the detection information from the congestion status detecting means.

In the data communication system of the present invention, the transit trunk control means in the transmitting variable-length data exchange transfers selectively data to be transferred from the terminal trunk 2 to the standard transit line 3 or the backup transit line 4.

The first alternate control means in the transit trunk control means controls to forward data to be transferred via the backup transit trunk by detecting the congestion status of the standard transit line 3 in the congestion status detecting means, based on the detection information from the congestion status detecting means.

According to the data communication system of the present invention, the transit trunk control means can reduce the load of the standard transit line 3 by detouring controllably data to be transferred via the backup transit line, based on the detection information from the congestion status detecting means. Hence there is an advantage in that since the standard transit line 3 can be shifted from the congestion status to the normal status, communications from the data terminal can be guaranteed.

Furthermore, according to the data communicating method of the present invention, a transmitting data exchange accommodating a transmitting data terminal 1 via a terminal trunk 2, for exchanging data, and a receiving data exchange accommodating a receiving data terminal 1 via the terminal link 2, for exchanging data are prepared. The transmitting data exchange transfers data to the receiving data exchange, using a standard transit line 3 which can transfer data to a predetermined transfer destination in a transit system or a backup transit line 4 which can detour to be transferred with the standard transit line 3 to the predetermined transfer destination. The transmitting data exchange transmits selectively data to be transferred from the terminal trunk 2 to the standard transit line 3 or the backup transit line 4, detects the congestion status in the standard transit line 3, and by-passes data to be transferred using the backup transit line 4, based on the detection information on the congestion status.

In the data communicating method of the present invention, the transmitting data exchange transfers selectively data to be transferred to the standard transit line 3 or the backup transit line 4, detects the congestion status in the standard transit line 3, and detours data to be transferred via the backup transit line 4, based on the detection information regarding the congestion status.

According to the data communicating method of the present invention, the transmitting data exchange can reduce the load of the standard transit trunk by controllably detouring data to be transferred, via the backup transit line, based on the detection information from the congestion status detecting means. There is an advantage in that since the standard transit line is shifted from the congestion status to the normal status, communications from the variable-length data terminal can be guaranteed.

Figure 3:
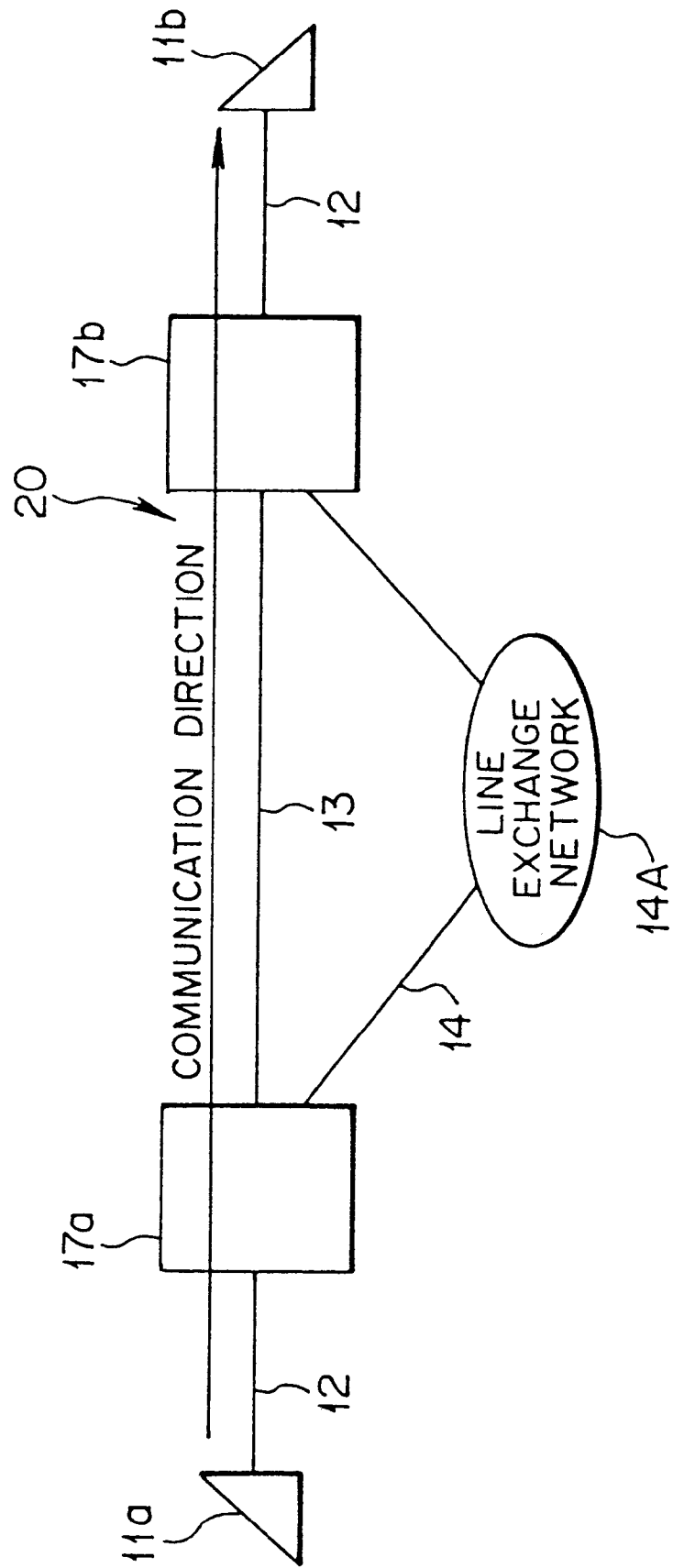
FIG. 3 is a block diagram showing a frame relay communication system according to an embodiment of the present invention.

(b) Frame relay communication system applied to an embodiment of the present invention:

FIG. 3 is a block diagram showing the frame relay communication system acting as a variable-length data communication system, according to the first embodiment of the present invention. Referring to FIG. 3, numeral 17a represents a transmitting node (transmitting variable-length data exchange). The transmitting node 17a accommodates the transmitting frame relay terminal (transmitting variable-length data terminal) 11a via the terminal trunk 12 to exchange frames from the transmitting frame relay terminal 11a.

Numeral 17b represents a receiving node (receiving variable-length data exchange). The receiving node 17b accommodates the receiving frame relay terminal (receiving variable-length data terminal) 11b via the terminal trunk 12 to exchange variable-length data.

In the transit system 20, the transmitting node 17a is connected to the receiving node 17b via the standard transit trunk (or standard transit line) 13 that can transfer data to a predetermined transfer destination and the backup transit trunk (or backup transit line) 14 that bypasses data to be transferred to the predetermined transfer destination.

The backup transit trunk 14 is connected via, for example, the trunk switching network 14A.

The transmitting node 17a transfers data to the receiving node 17b via the standard transit trunk 13 or the backup transit trunk 14. Thus frame relay communications is performed between the transmitting frame relay terminal 11a and the receiving frame relay terminal 11b.

In concrete, according to the frame relay procedure, data is bypassed or detoured to the backup transit trunk 14 via the trunk switching network before the step (heavy congestion) in which a frame is discarded as the final countermeasure against the trunk congestion.

Therefore, since data is detoured via the backup transit trunk 14 in a heavy traffic, the network which can deal with a variation in traffic can be configured.

The congestion status includes light congestion and heavy congestion. The light congestion means that the load from a user to a network approaches the tolerance limit of the network and the rise rate of the throughput in a network decreases. In this case, an expressive congestion (defined by the address field of a frame relay) is reported to the terminal.

The heavy congestion means that the congestion of a network worsens further while the throughput itself of a network decreases. In this case, as described above, the frame sent from the terminal is discarded.

In the frame relay communication system, the transmitting node 17a accommodating the transmitting frame relay terminal 11a can adopt the routing method that registers the node numbers of the receiving node 17b accommodating the receiving frame terminal 11b every DLCI (Data Link Connection Identifier). In the routing method, the transmitting node 17a decides the output route according to the receiving node number.

Figure 4:
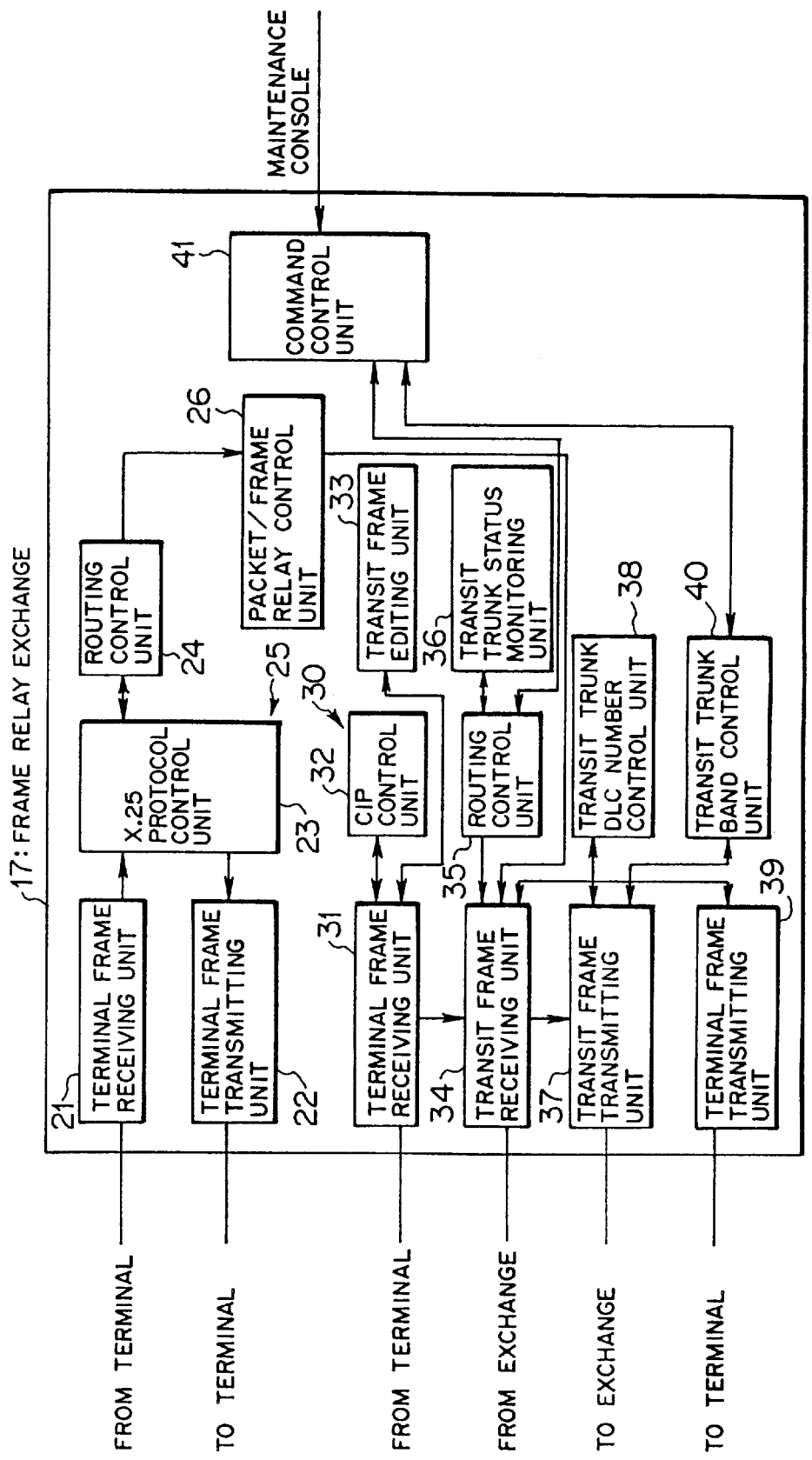
FIG. 4 is a diagram showing a transmitting or receiving frame relay exchange applied to the present embodiment according to the present invention.

(c) Outline of frame relay exchange applied to an embodiment of the present invention:

FIG. 4 is a diagram showing the transmitting or receiving frame relay exchange applied to each embodiment of the present invention. Referring to FIG. 4, numeral 30 represents a frame relay exchange processor. The frame relay exchange processing unit 30 executes a frame transmitting and receiving process made from a user to a frame relay exchange and a frame transmitting and receiving process between the frame relay exchanges. The frame relay exchange processing unit 30 is formed of by arranging the following processing units (numerals 31 to 40) in the node (frame relay exchange) 17 in the form of firmware stored in the main memory (MM) (not shown).

Numeral 31 represents a terminal frame receiving unit. The terminal frame receiving unit 31 processes upon receiving the frame 42 (shown in FIG. 5(a)) sent from the frame relay terminal.

In concrete, when receiving the frame 42 from the frame relay terminal, the terminal frame receiving unit 31 checks the inflow data amount (flow) from the frame relay terminal by activating the CIR control unit 32 (to be described later).

Figure 5:
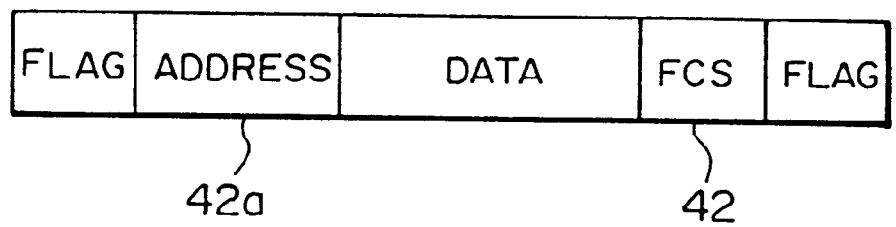
FIG. 5(a) is a diagram showing a frame relay format.
FIG. 5(b) is a diagram showing a frame relay format.
Figure 5:
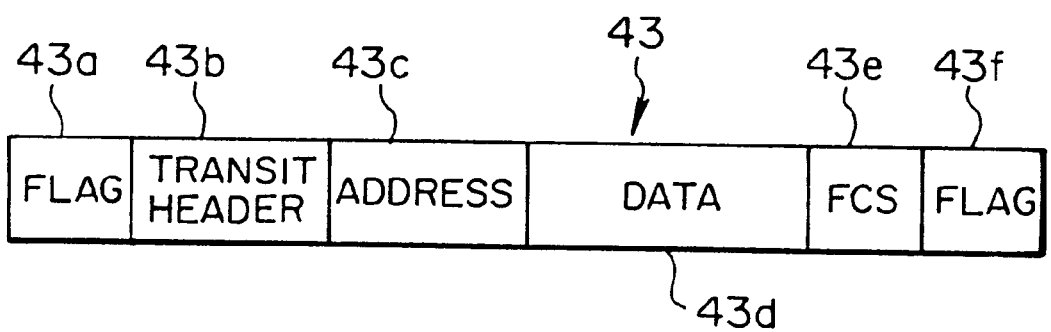

The terminal frame receiving unit 31 receives recovery information and a receive frame each as input information from the CIR control unit 32 to activate the transit frame editting unit 33. Thus the receive frame is format-converted into the frame 43 to bridge between the nodes 17, as shown in FIG. 5(b). The converted frame 43 is reported to the transit frame receiving unit 34.

The CIR control unit 32 is activated by the terminal frame receiving unit 31 when a frame is received from the frame relay terminal, and then monitors the amount of data sent from the frame relay terminal. When the data amount exceeds CIR, the fact is reported as recovery information to the terminal frame receiving unit 31.

The CIR (Committed Information Rate) is decided at a call setting time and means an information transfer rate at which a frame relay network guarantees at its normal time.

Moreover, the transit frame editing unit 33 is activated by the terminal frame receiving unit 31 and sets congestion information (such as DE (Discard Eligibility Indicator) bit or the like) in the address field of a frame received from the frame relay terminal when the terminal frame receiving unit 31 is reported that the data amount as input information from the CIR control unit 32 exceeds CIR.

The transit frame editing unit 33 converts the format into a frame form to relay between the nodes 17. In concrete, as shown with the frame 43 in FIG. 5(b), a transit header 43b including the remote node number, the frame serial number, and the like is sandwiched between the address field 43c and the flag 43a.

In FIG. 5(b), numeral 43d represents a data field, 43e represents a FCS (Frame Check Sequence) field, and 43f represents a flag.

The transit frame receiving unit 34 is activated when it receives a frame sent from the standard transit trunk 13 or the backup transit trunk 14 or receive a notification from the terminal frame receiving unit 31. Then the routing control unit 35 (to be described later) is activated to decide a trunk to which a frame is transferred. If the frame is transferred to the self exchange, the terminal frame transmitting unit 39 is activated. If the frame is transferred to another exchange, the transit frame transmitting unit 37 is activated.

The routing control unit 35 is activated by the transit frame receiving unit 34. Then the routing control unit 35 retrieves routing data, based on the remote node number information included in the transit header 43b of the receive frame 43, using the routing data set by the command control unit 41 (to be described later), thus deciding a transit trunk by which the frame is transmitted.

Then the routing control unit 35 inquires the congestion status of the decides transit trunk from the transit trunk status monitoring unit 36. If normal, the corresponding line is selected. If the status is congested, an alternate route is decided by selecting DLC with priority according to the routing data, based on the information regarding an alternate attribute from the command control unit 41.

The DLCI number used to retrieve information regarding an alternate attribute exists in the address field 43c of the receive frame 43.

The transit trunk status monitoring unit 36 monitors the stay of a queue connected to each transit trunk at a frame transmitting time for a fixed period (Ts) of time, thus monitoring the congestion status of each transit trunk. The transit trunk status monitoring unit 36 reports the congestion status in response to an inquiry about the congestion status of a trunk specified by the routing control unit 35.

Moreover, the transit frame transmitting unit 37 is activated by the transit frame receiving unit 34 to perform a frame transmitting process between nodes 17.

The terminal frame transmitting unit 39 sets the address portion 42a including information regarding a remote DLC number or the like to the terminal trunk frame 42 and then transmits the frame 42 to the frame relay terminal.

Numeral 38 represents a transit trunk DLC number control unit, and 40 represents a transit trunk band control unit.

The command control unit 41 includes a management table that accepts and sets registration of the alternate attribute of a transmitting DLC, the node number of a receiving DLC, or the like every PVC (Permanent Virtual Call: remote fixed connection). In order to transmit a frame, the command control unit 41 accepts registration of the routing data which decides a transit trunk.

Numeral 25 represents a packet switching unit. The packet switching unit 25 subjects a transmitting frame or receiving frame to a packet switching between the transmitting or receive packet terminals, and acts as a firmware function stored in the main memory (MM) (not shown) which includes the terminal frame receiving unit 21, the terminal frame transmitting unit 22, the X.25 protocol control unit 23, the routing control unit 24, and the packet/frame relay control unit 26.

The terminal frame receiving unit 21 receives a packet from a terminal. The X.25 protocol processing unit 23 subjects a packet received by the terminal frame receiving unit 21 to the X.25 protocol analysis (check) recommended by the ITU-T.

When the result of the X.25 protocol analysis made by the X.25 protocol processing unit 23 is correct, the routing control unit 24 judges whether the destination is the self exchange or a remote exchange, by referring to the destination address in a packet. If the destination is a remote exchange, the trunk through which the frame is transferred is decides according to the routing data.

The packet/frame relay control unit 26 is activated when the trunk decides by the routing control unit 24 is a frame relay transit trunk. Then the packet/frame relay control unit 26 converts a packet received from the routing control unit 24 into a frame relay format and then activates the transit frame receiving unit 34.

In the packet/frame relay control unit 26, the packet to frame relay format conversion is made by inserting a packet in the data portion of a frame relay without any change and arranging an address portion, a transit header including a transit header remote node number, and the like.

In such a manner, the frame relay exchange can perform the frame relay transiting by subjecting packets to a frame relay process.

Figure 6:
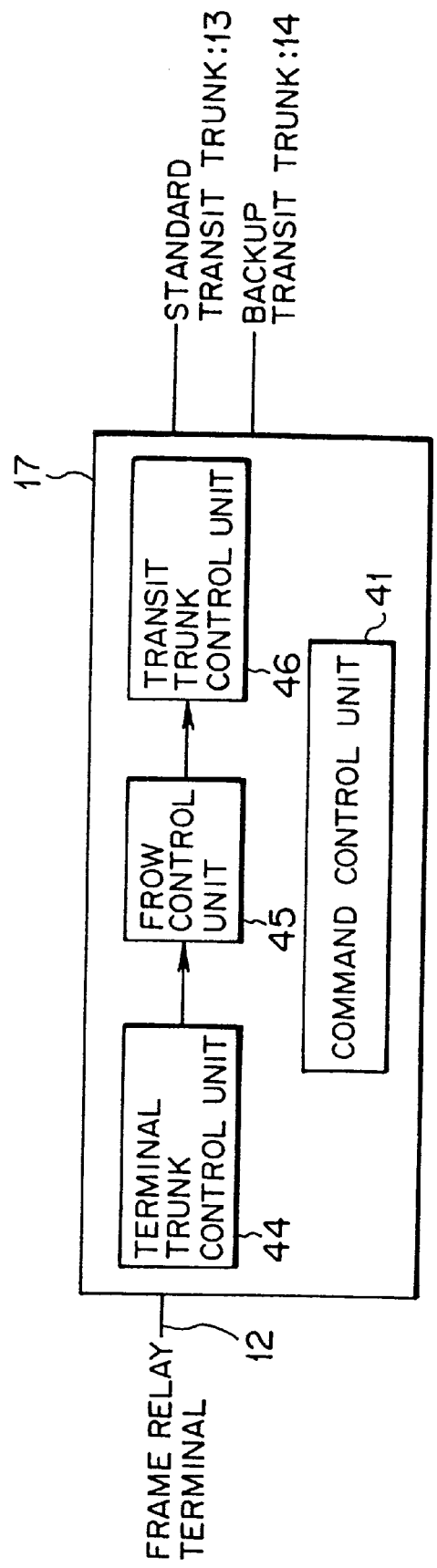
FIG. 6 is a block diagram used for explaining an alternate transfer process to a backup transit trunk of a frame relay exchange according to the present embodiment.

(d) Alternate transfer process to backup transit trunk of the frame relay exchange according to the present embodiment:

FIG. 6 is a block diagram used for explaining an alternate transfer process to a backup transit trunk in the frame relay exchange according to the present embodiment. Referring to FIG. 6, like that shown in FIG. 4, the command control unit (alternate priority setting means) 41 includes a management table which registers and sets the alternate attribute (priority) of DLC as data link identification information set every terminal trunk, the node number of a receiving DLC, and the like.

Figure 7:
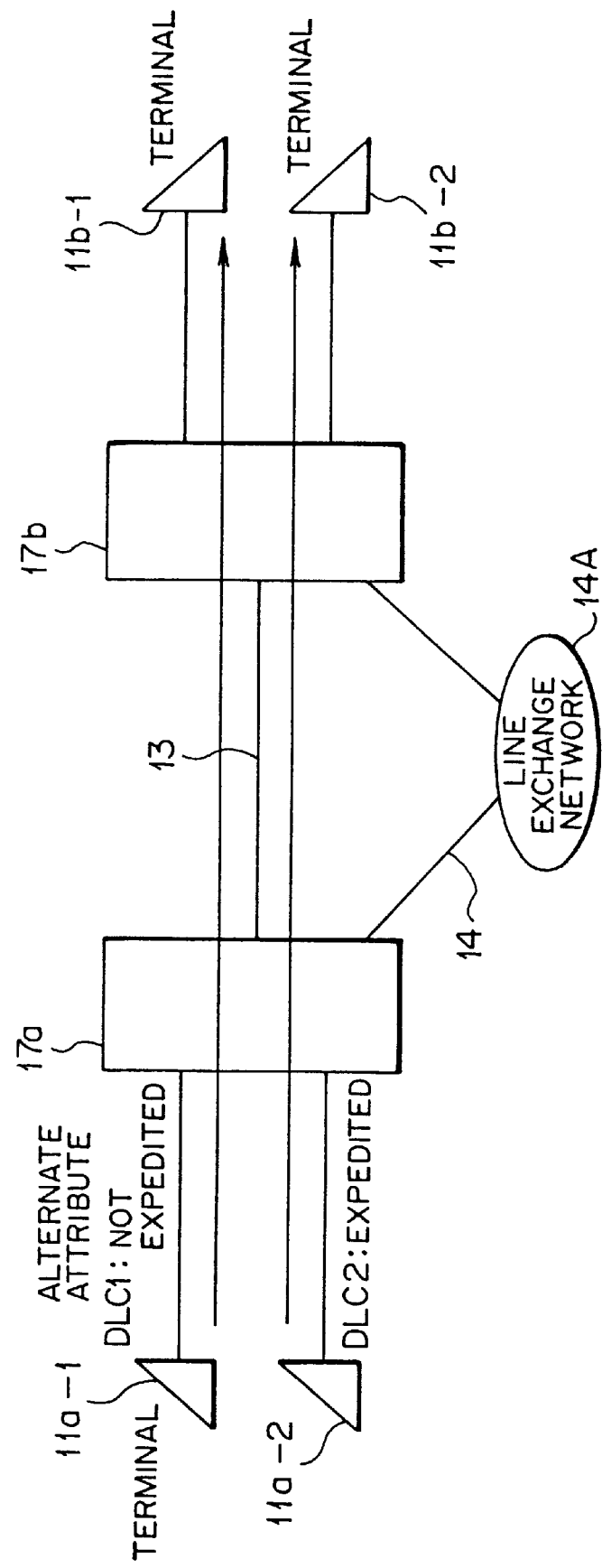
FIG. 7 is a block diagram showing a frame relay communication system according to the present embodiment of the present invention.

In the management table, for example, the alternate attribute of DLC1 in the trunk connected to the transmitting terminal 11*a*-1 is set as "non-priority" and the alternate attribute of DLC2 in the trunk connected to the transmitting terminal 11*a*-2 is set as "priority", as shown in FIG. 7.

Numeral 44 represents a terminal trunk control unit. The terminal trunk control unit 44 controls the terminal trunk 12 connected to the frame relay terminal. The terminal trunk control unit 44 functions as the terminal frame receiving units 21 and 31 and the terminal frame transmitting units 22 and 39 shown in FIG. 4.

Numeral 45 represents a flow control unit. The flow control unit 45 subjects a frame to a flow control (flow data control). The flow control unit 45 functions as the terminal frame receiving unit 31, the CIR control unit 32, and the transit frame editing unit 33.

Moreover, numeral 46 represents a transit trunk control unit (congestion status detecting means, the first alternate control means). The transit trunk control unit 46 functions as the transit frame receiving unit 34, the routing control unit 35, the transit trunk status monitoring unit 36, the transit frame transmitting unit 37, the transit trunk DLC number control unit 38, and the transit trunk band control unit 40, shown in FIG. 4. When the transit trunk control unit 46 detects congestion in the standard transit trunk 13, a connecting process to the backup transit trunk 14 is performed so that the frame to be transferred with the priority DLC (specific DLC) of an alternate attribute is transmitted to the backup transit trunk 14.

In other words, the transit trunk control unit 46 detects the congestion status of the standard transit trunk 13, and controls so as to detour transfer data using the backup transit trunk 14, based on the detection information of the congestion status and the alternate attribute set by the command control unit 41.

In this case, when the standard transit trunk 13 becomes a congestion status, the frame from the trunk of DLC2 to which the alternate attribute is set as "priority" can be preferentially detoured to the backup transit trunk 14.

In this case, when the standard transit trunk 13 becomes a congestion status, the frame from the trunk of DLC2 to which the alternate attribute is set as "priority" can be preferentially detoured to the backup transit trunk 14.

In FIG. 7, when a frame is bypassed from the transmitting terminal 11*a*-2 to the backup transit trunk 14, the frame is discarded if the order of frames is reversed at the receiving node 17*b*.

Figure 8:
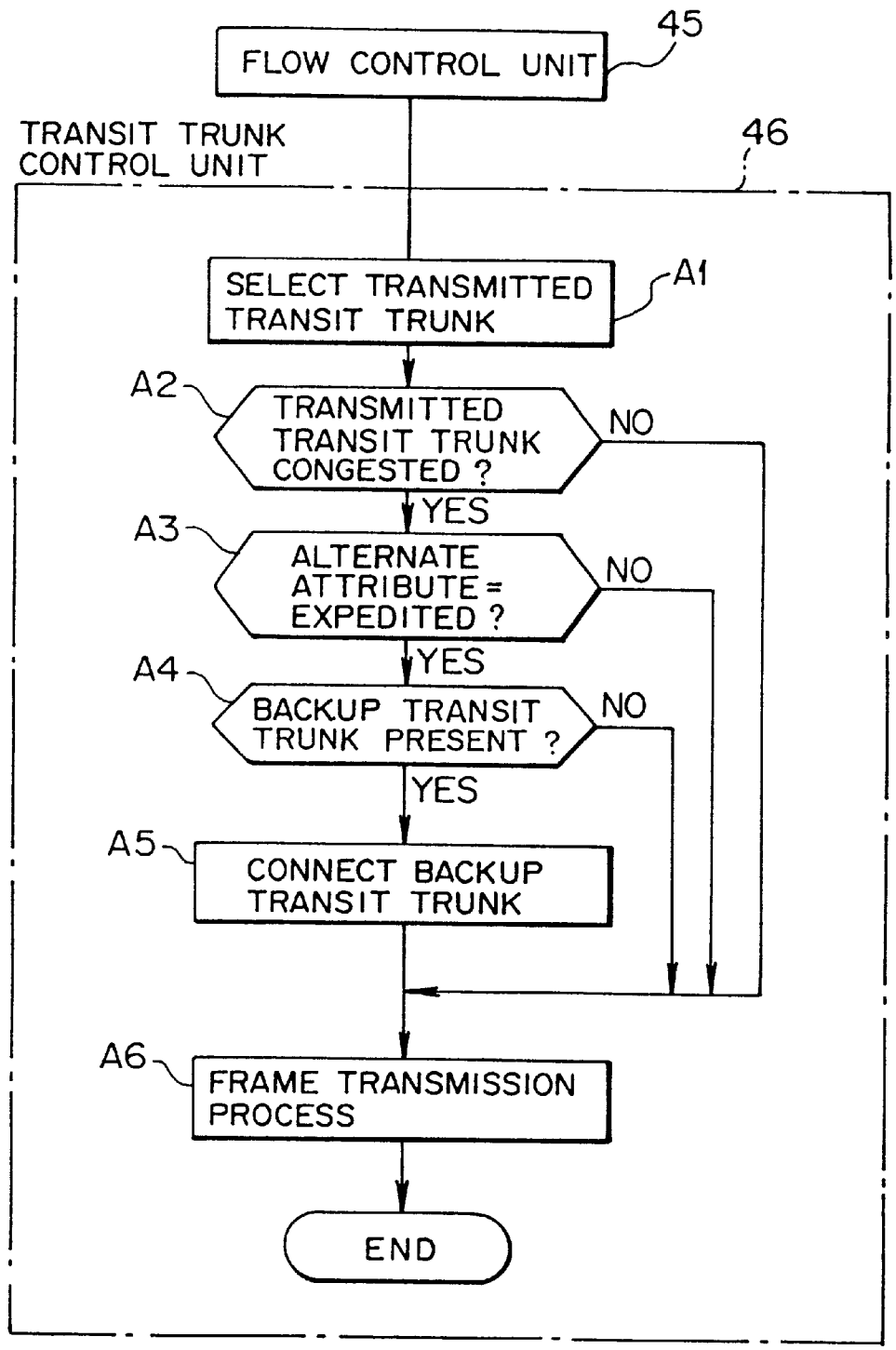
FIG. 8 is a flow chart used for explaining the alternate transfer process by a transit trunk control unit according to the present embodiment of the present invention.

In such a configuration, the alternate transfer process of the transit trunk control unit 46 is described in detail by referring to FIGS. 4 and 8.

The routing control unit 35 in the transit trunk control unit 46 retrieves the routing data set with the management table in the command control unit 41, based on the remote node number information included in the transit header in a frame sent from the flow control unit 45, and then selects the destination transit trunk (standard transit trunk 13) (step A1).

The transit trunk status monitoring unit 36 judges whether a selected destination transit trunk is in a congestion status (step A2). When the selected destination transit trunk is normal, the routing control unit 35 transmits the frame using the trunk (from step A2 to step A6 via NO route).

When a selected destination transit trunk is in a congestion status, the command control unit 41 retrieves information regarding alternate attribute, based on the DLCI information of the address field of the frame (from step A2 to step A3 via YES route).

When the alternate attribute corresponding to the retrieved DLCI information is not "priority", the frame transmission process is performed using the selected destination transit trunk (step A3 to step A6 via NO route).

Where the alternate attribute is "priority" and no backup transit trunk 14 exists, the frame transmission process is performed using the selected destination transit trunk (step A4 to step A6 via NO route). Where the backup transit trunk 14 exists (YES route from step A5), the transit frame transmitting unit 37 performs a frame transmission process using the backup transit trunk 14 (steps A5 and A6).

According to the alternate transfer process in the frame relay exchange of the present embodiment, when the standard transit trunk 13 is in a light congestion status, the load of the standard transit trunk 13 can be reduced by detouring communications from the transmitting terminal 11a-2 with priority alternate attribute via the backup transit trunk 14, whereby the congestion status can be changed to the normal status. Hence there is an advantage in that the communication from the transmitting terminal 11a-1 can be guaranteed.

Figure 9:
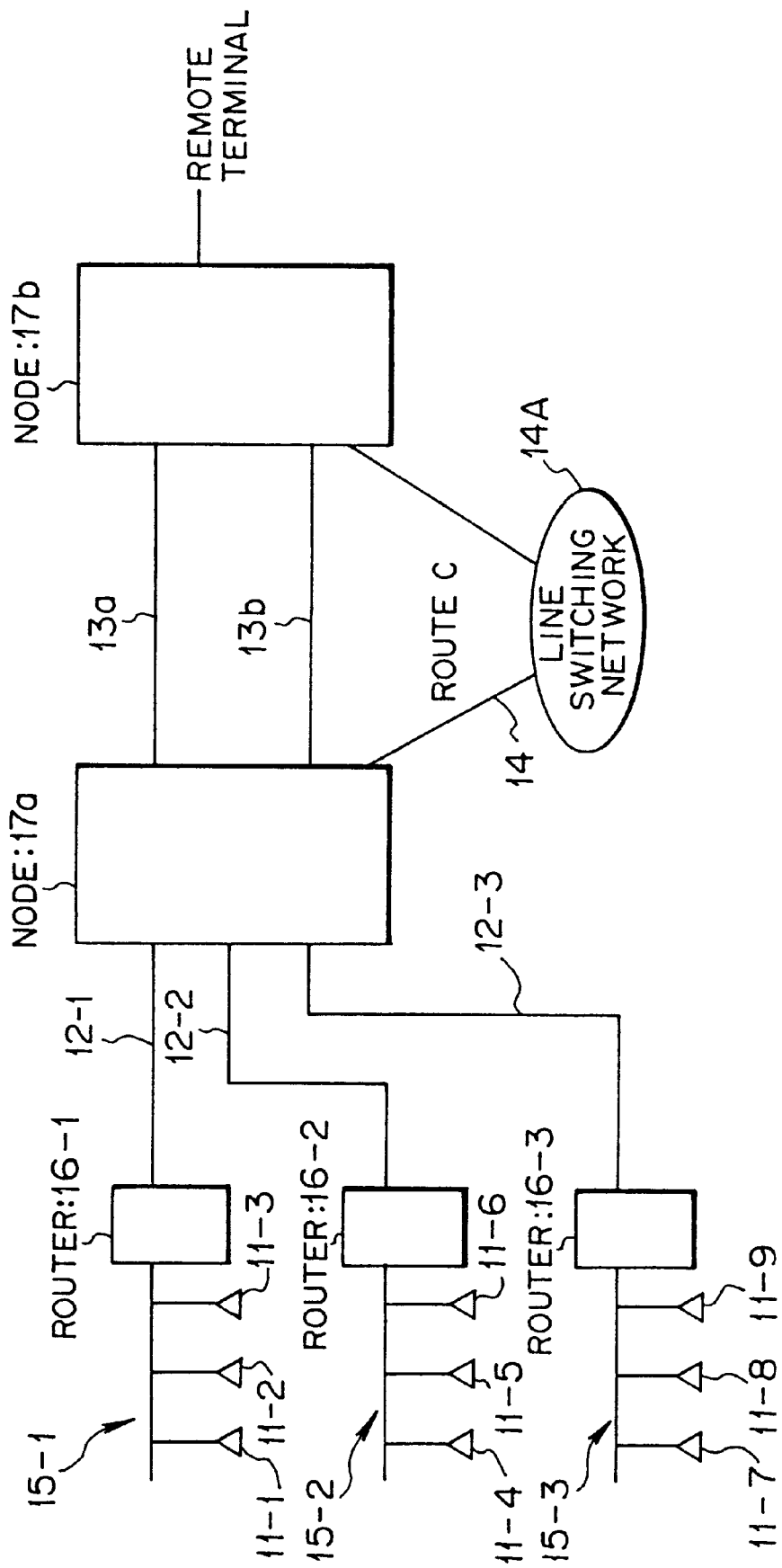
FIG. 9 is a block diagram showing a frame relay communication system according to the present embodiment of the present invention.

(e) Alternate transfer process by the transmitting frame relay exchange where plural terminals provide DLCI every group in the frame relay communication system according to the present embodiment:

FIG. 9 is a diagram showing an alternate transfer process in the transmitting frame relay exchange 17a where a terminal group is formed of plural frame relay terminals in the frame relay communication system according to the present embodiment.

As shown in FIG. 9, plural frame relay terminals 11-1 to 11-9 are included in a node 17a. The frame relay terminals 11-1 to 11-3 are connected to the router 16-1 to form a terminal group 15-1. The frame relay terminals 11-4 to 11-6 are connected to the router 16-2 to form a terminal group 15-2. The frame relay terminals 11-7 to 11-9 are connected to the router 16-3 to form a terminal group 15-3.

The terminal group 15-1 is accommodated in the node 17a via the terminal trunk 12-1 with different plural DLCIs. The terminal group 15-2 is accommodated in the node 17a via the terminal trunk 12-2 with different plural DLCIs. The terminal group 15-3 is accommodated in the node 17a via the terminal trunk 12-3 with different plural DLCIs.

The node 17a has the configuration shown in FIG. 4 or 6. In the node 17a, the command control unit 41 includes, for example, the routing table 41a and the alternate attribute management table 41b used to relay frames to the node 17b as shown in FIG. 10.

The routing table 41a is used to set a priority to a DLCI set to each of the terminal trunks 12-1 to 12-3 in the terminal groups 15-1 to 15-3, according to the destination node number.

In concrete, with the alternate attributes of the terminal groups 15-1 and 15-2 being "priority" and the alternate attribute of the terminal group 15-3 being "non-priority", when congestion occurs in the standard transit trunk 13a being the first route of each of the terminal groups 15-1 and 15-3, the frame is detoured from the terminal group 15-1 with the "priority" alternate attribute to the backup transit trunk 14 being the second route so that the terminal group 15-3 allows continuous communication using the standard transit trunk 13a being the first route.

In the alternate attribute management table 41b, as shown in FIG. 11, a group number is registered every DLCI, together with the destination node number and an alternate attribute is allocated to the group number.

Figure 12:
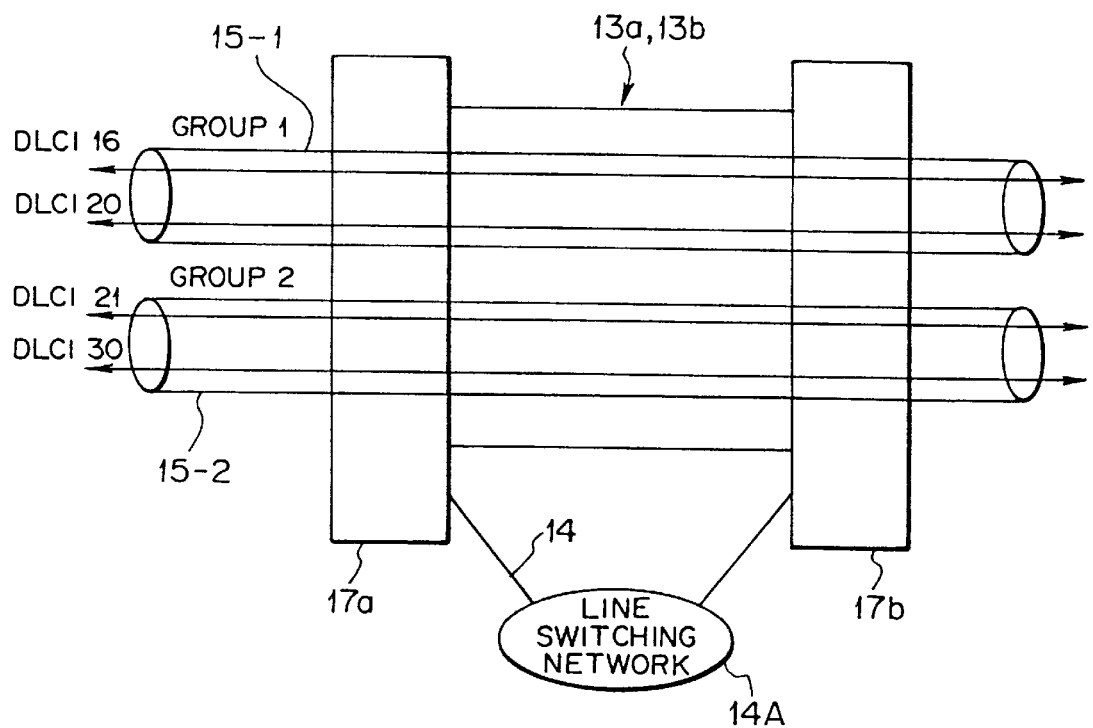
FIG. 12 is a block diagram showing a frame relay communication system according to an embodiment of the present invention.

In accordance with the alternate attribute management table 41b, plural DLCIs in the same routes (standard transit trunks 13a, 13b) can be divided into some groups, as shown in FIG. 12. In concrete, the DLCI numbers (16 to 20) are allocated to the terminal group 15-1 to which the standard transit trunk 13a is designated as the first route. The DLCI numbers (21 to 30) are allocated to the terminal group 15-2 to which the standard transit trunk 13b is designated as the first route.

In such a configuration, in the frame relay communication system shown in FIG. 9, when a frame is input from the frame relay terminals 11-1 to 11-9 to the node 17a, the routing control unit 35 of the node 17a decides the output route based on the destination node number of the transit header 43b in the receive frame 43. However, at the same time, the group number allocated to the DLCI of the address portion 43c is linked to the output route (refer to the shaded portion of the alternate attribute management table).

Thereafter, if the output route is in congestion status, the terminal group 15-2 with "priority" is bypassed according to the routing data by referring to the alternate attribute management table 41b in route/group unit. Then the terminal group 15-2 can be connected to the backup trunk 14 acting as the second route.

Therefore, even if the terminal group is formed of plural frame relay terminals, the alternate transfer process can be performed. Hence there is an advantage in that the trunk can be accelerated to shift from the congestion status to the normal status.

Figure 13:
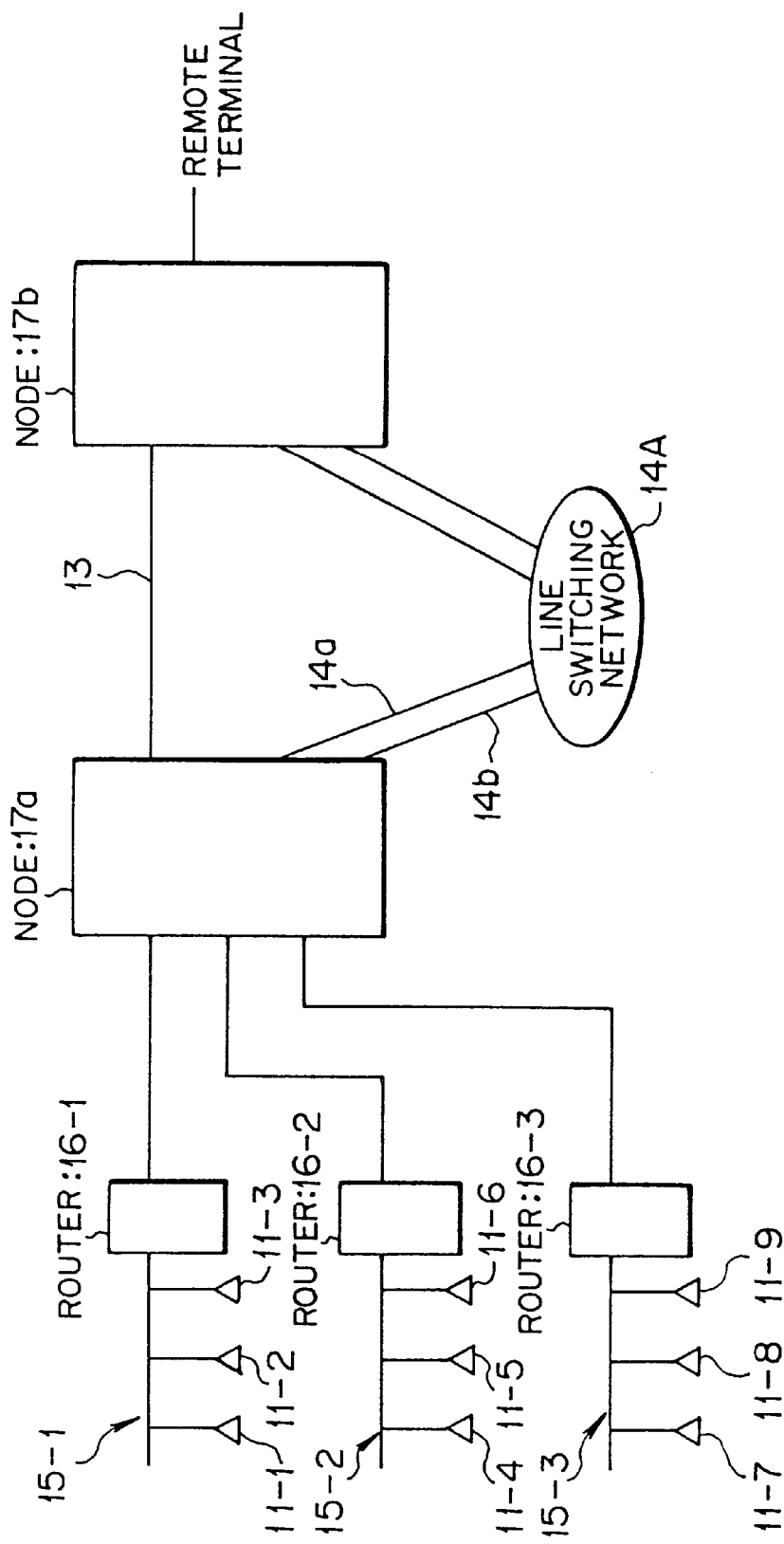
FIG. 13 is a diagram used for explaining a stepwise alternate transfer process in the frame relay communication system according to the present embodiment, with plural backup transit trunks connected in a transit system.

(f1) First mode in which stepwise alternate transfer process is performed to plural backup transit trunks in the frame relay communication system according to the present embodiment:

FIG. 13 is a diagram used for explaining the stepwise alternate transferring process where plural (e.g. two) backup trunks 14a and 14b connected in the transit system in the frame relay communication system of the present embodiment.

Like the configuration shown in FIG. 9, the terminal group 15-1 is constituted of frame relay terminals 11-1 to 11-3. The terminal group 15-2 is constituted of frame relay terminals 11-4 to 11-6. The terminal group 15-3 is constituted of frame relay terminals 11-7 to 11-9. A relay between the nodes 17a and 17b is established using the standard transit trunk 13 and two backup trunks 14a and 14b.

Figure 14:
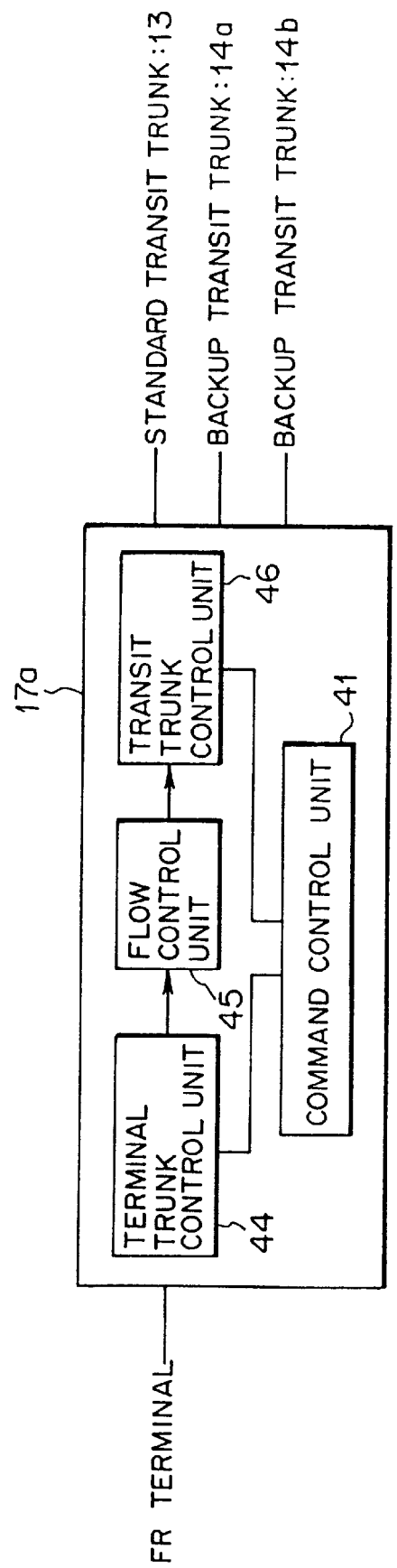
FIG. 14 is a functional block diagram showing the transmitting node in the frame relay communication system according to the present embodiment.

The node 17a, as shown in FIG. 14, includes the terminal trunk control unit 44, the flow control unit 45, the transit trunk control unit 46, and the command control unit 41.

At the time of the system configuration, the command control unit 41 allocates the frame relay terminals 11-1 to 11-3, 11-4 to 11-6, and 11-7 to 11-9 to the terminal groups 15-1, 15-2, and 15-3, respectively, and links the backup transit trunks 14a and 14b to the terminal groups 15-1 to 15-3 under command and includes the routing table 41C, for example, as shown in FIG. 15.

As shown in FIG. 15, the alternate attribute to the backup transit trunks 14a and 14b in each of the terminal groups 15-1 to 15-3 is previously set. In response to the command, an alternate transfer is performed based on the routing table 41c.

When detecting congestion in the standard transit trunk 13 in response to frames from the terminal trunk 12-1, 12-2, or 12-3, the transit trunk control unit (second alternate control means) 46 detours the terminal group 15-1, 15-2, or 15-3 linked to the backup transit trunk 14a and 14b.

The terminal trunk control unit 44 and the flow control unit 45 have the same functions as those shown in FIG. 6.

Figure 16:
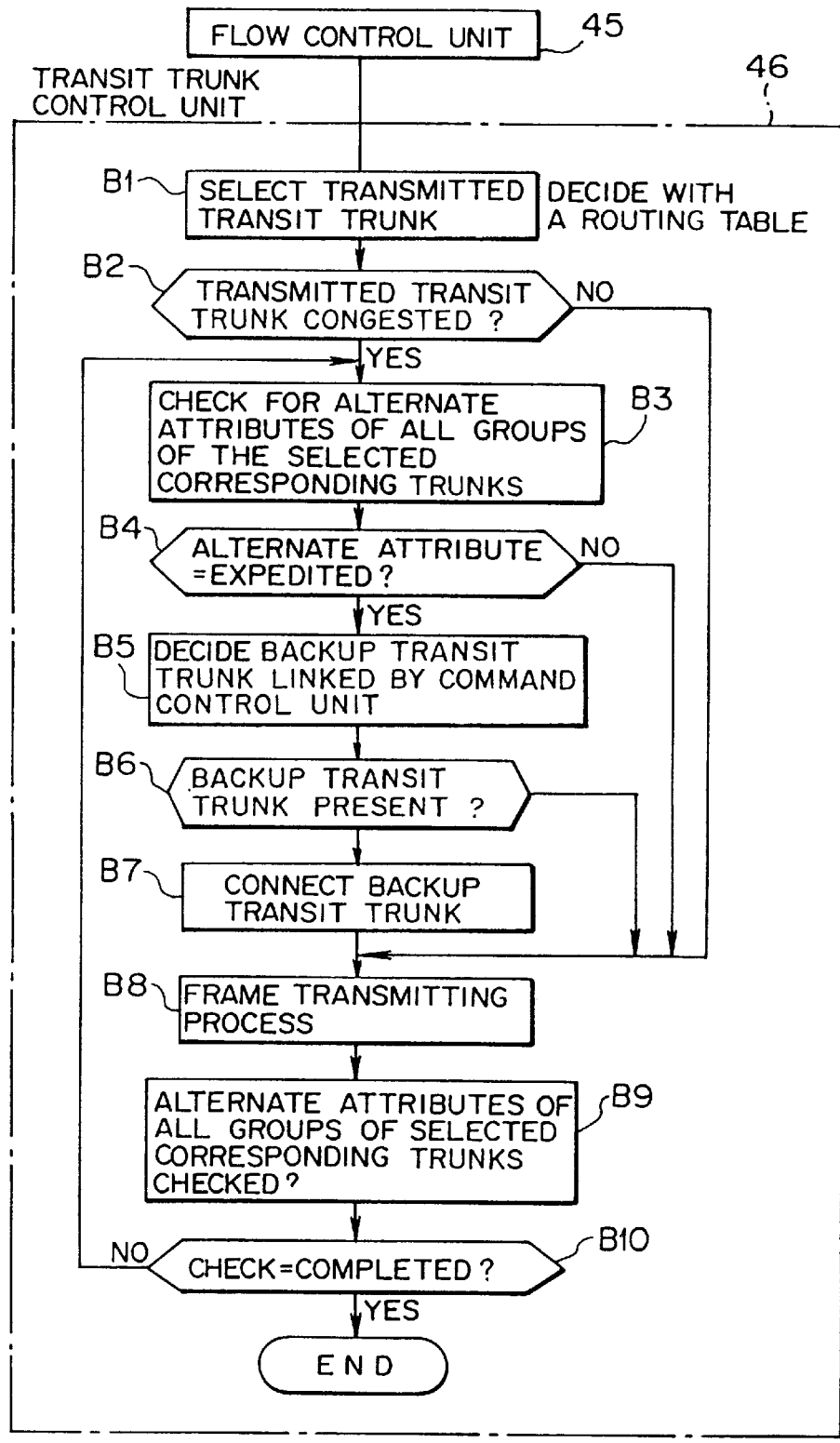
FIG. 16 is a flowchart used for explaining the first mode of the stepwise alternate transfer process to the backup transit trunk according to the present embodiment of the present invention.

In such a configuration, the first mode in which an alternate transfer process is stepwise made via the backup transit trunk 14a or 14b while the frame relay terminals 11-1 to 11-3, 11-4 to 11-6, or 11-7 to 11-9 communicate to the remote terminal 11b via the standard transit trunk 13 will be explained below with reference to the flowchart shown in FIG. 16 and the block diagrams shown in FIGS. 4 and 14.

When the flow control unit 45 inputs a frame to the transit trunk control unit 46, the routing control unit 35 retrieves the routing table 41a of the command control unit 41, based on the remote node number information included in the transit header in the input frame, and then selects the destination transit trunk (the standard transit trunk 13 or the backup transit trunks 14a and 14b), based on the routing data set in each of the terminal groups 15-1 to 15-3 (step B1).

The transit trunk status monitoring unit 36 judges whether a selected destination transit trunk is in a congestion status (step B2). If in a congestion status, all the terminal groups 15-1 to 15-3 selecting lines in congestion status are checked for the alternate attributes (from step B2 to step B3 via YES route). The backup transit trunks 14a and 14b linked by the command control unit 41 are decided to the terminal groups 15-1 to 15-3 with alternate attributes of "priority" (from step B4 to step B5 via YES route).

Moreover, when the decided backup transit trunk 14a or 14b exists (YES route in step B6), the transit frame transmission processing unit 37 executes a frame transmission process by using the backup transit trunk 14a or 14b (step B7 and B8).

With the destination transit trunk being normal, or in non-congestion status, (NO route in step B2), the alternate attribute corresponding to the retrieved DLCI information being not "priority" (NO route in step B4), and the backup transit trunk 14 not existing (NO route in step B6), the routing control unit 35 executes a frame transmission process using a selected destination transit trunk (step B8).

When congestion occurs in the destination transit trunk, it is checked whether the alternate attributes of all the terminal groups 15-1 to 15-3 have been checked. The steps B3 to B8 are performed until the completion of the checking process (steps 9 and 10).

As described above, according to the first aspect of the stepwise alternate transfer process to plural backup transit trunks in the frame relay communication system of the present embodiment, the alternate transfer of the backup transit trunks 14a and 14b is performed using the backup transit trunk for the terminal group 15-1, 15-2, or 15-3 as a unit allocated by the command control unit 41. Hence the backup transit trunk can be effectively used. There is an advantage in that the communication efficiency can be improved.

(f2) Second mode in which stepwise alternate transfer process is performed to plural backup transit trunks in the frame relay communication system according to the present embodiment:

Like the first aspect, the second aspect of the stepwise alternate transfer process to plural backup transit trunks in the frame relay communication system of the present embodiment can be applied to the frame relay communication system shown in FIG. 13. The node 17a has the configuration as shown in FIG. 14.

In the second aspect of the stepwise alternate transfer process to the backup transit trunks 14a and 14b of the present embodiment, the stepwise alternate transfer process is performed according to the traffic or congestion status of a trunk in a network.

Figure 17:
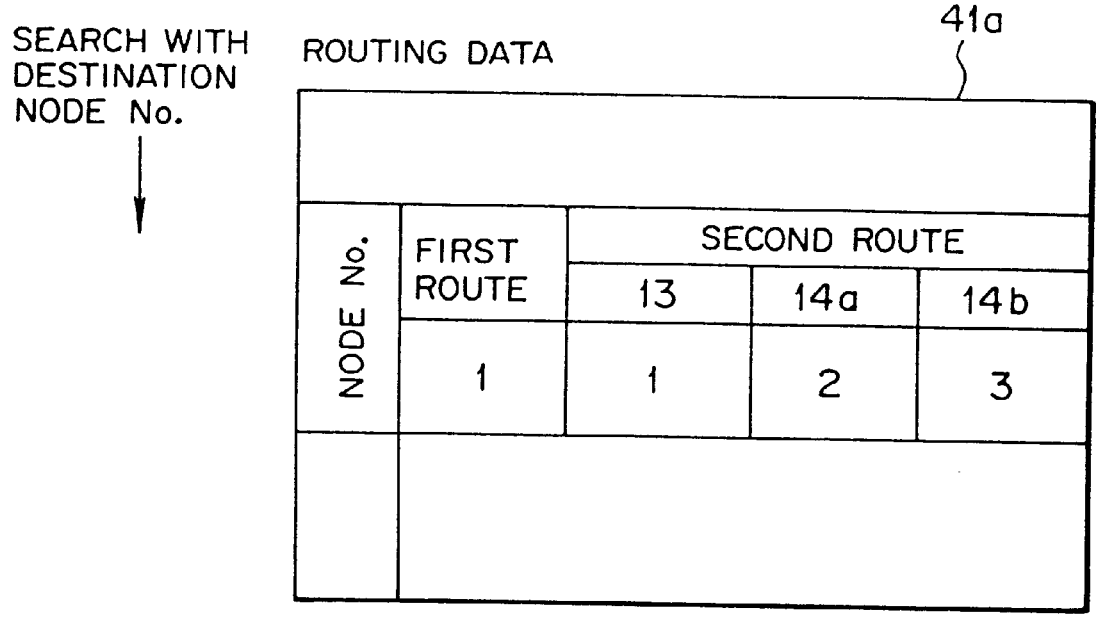
FIG. 17 is a diagram showing the routing table according to the present embodiment of the present invention.

The command control unit 41 includes the routing table 41a as shown in FIG. 17. While the frame relay terminals 11-1 to 11-3, 11-4 to 11-6, or 11-7 to 11-9 are communicating to the remote terminal 11b via the standard transit trunk 13, the transit trunk control unit 46 monitors the terminals every terminal group, 15-1, 15-2, and 15-3, together with the use rate of each of the transit 13, 14a, and 14b.

If congestion occurs in the standard transit trunk 13, the transit trunk control unit 46 detours, for example, only the terminal group 15-2 via the backup transit trunk 14a. If congestion occurs again in the standard transit trunk 13 while the trunk use rate of the backup transit trunk 14a exceeds a specified value, the transit trunk control unit 46 detours only the remaining terminal group 15-3 via the backup transit trunk 14b.

Figure 18:
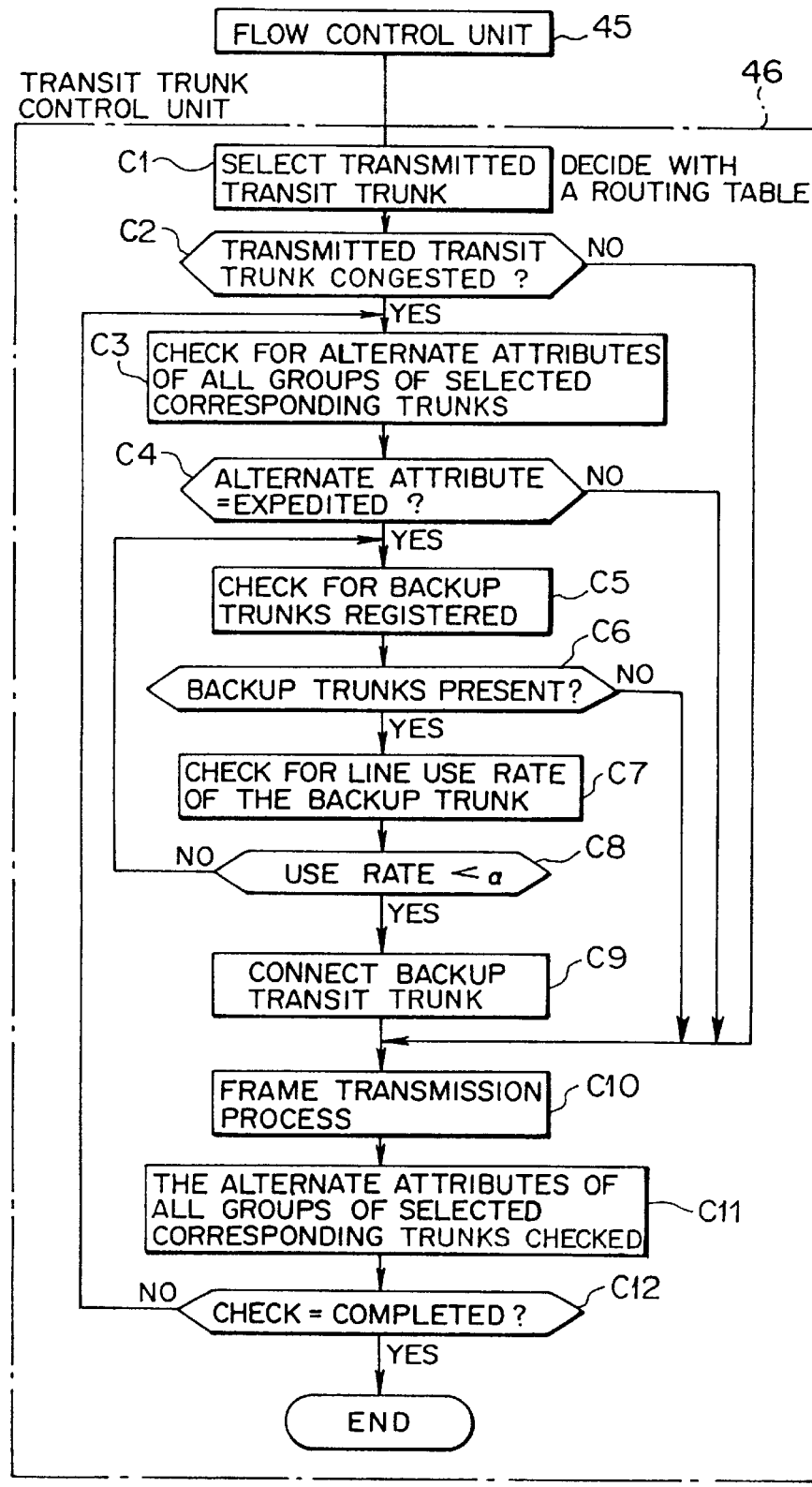
FIG. 18 is a flowchart used for explaining the second mode of the stepwise transfer process to the backup transit trunk according to the present embodiment of the present invention.

In such a configuration, explanation will be made below as to the second mode in which the stepwise alternate transfer process is performed via the backup transit trunks 14a and 14 while the frame relay terminals 11-1 to 11-9 are communicating to the remote terminal 11b via the standard transit trunk 13, by referring to the flowchart shown in FIG. 18 and the block diagrams shown in FIGS. 4 and 14.

In other words, when a frame is input from the flow control unit 45 to the transit trunk control unit 46, the routing control unit 35 retrieves the routing table 41a in the command control unit 41, based on the remote node number information included in the transit header of the input frame, and selects the destination transit trunk (standard transit trunk 13 or the backup transit trunks 14a and 14b), based on the routing data set to the terminal 15-1, 15-2, or 15-3 (step C1).

The transit trunk status monitoring unit 36 judges whether the selected destination transit trunk is in a congestion status (step C2). If the destination transit trunk is in a congestion status, the transit trunk status monitoring unit 36 checks the alternate attributes of all the terminal groups 15-1 to 15-3 selecting the trunk in the congestion status (step C2 to step C3 via YES route). Then the command control unit 41 decides backup transit trunks 14a and 14b linked by the command control unit 41 for the terminal group 15-1, 15-2, or 15-3 with "priority" alternate attributes (step C4 to step C5 via YES route).

When there is a decided backup transit trunk 14a or 14b (YES route in step C6), the transit frame transmission processing unit 37 performs a frame transmission process using the backup transit trunk 14a or 14b (steps C7 and C8).

In the case where the destination transit trunk is normal, or in non-congestion status (NO route in step C2), the alternate attribute corresponding to the retrieved DLCI information is not "priority" (NO route in step C4), and there are no backup transit trunks 14 (NO route in step C6), the routing control unit 35 performs the frame transmission process using the selected destination transit trunk (step C8).

Then it is judged whether the alternate attributes of all the terminal groups 15-1 to 15-3 have been checked with the destination transit trunk in congestion status. The steps C3 to C8 are processed until the completion of the checking operation (steps C9 and C10).

As described above, like the first mode, there is an advantage in that the backup transit trunk can be effectively used also in the second mode of the alternate transfer process made stepwide to plural backup transit trunks in the frame relay communication system according to the present embodiment.

(g) Stepwise switching control to the original standard transit trunk in the frame relay communication system according to the present embodiment:

As described above, where the stepwise alternate transfer process is performed to plural backup transit trunks, the process that returns sequentially to the original standard transit trunk is performed as follows.

When the transit trunk status monitoring unit 36 detects the release from the congestion status of the standard transit trunk 13, provided that the trunk use-rate is smaller than a predetermined value, the routing control unit (return transferring means) 35 transfers data by returning the standard transit trunks sequentially to the original standard transit trunk, based on the trunk use-rate information of the backup transit trunks 14a and 14b sent from the transit trunk status monitoring unit 36.

In concrete, the transit trunk status monitoring unit 36 monitors the trunk use-rate of each of the standard transit trunk 13 and the backup transit trunks 14a and 14b, and turns back the trunk of which the trunk use-rate of the alternate backup transit trunks 14a and 14b drops to a specified value β when congestion is released with the trunk use-rate of the standard transit trunk 13 being less than a specified value α. Thereafter, when the trunk use-rate of the standard transit trunk 13 is less than the specified value α after a specified monitoring time γ, provided that the alternate backup transit trunk is at a value less than the specified value β, the transit trunk status monitoring unit 36 produces a control signal that returns the standard transit trunk 13.

The routing control unit 35 performs an alternate route returning process in response to the control signal from the transit trunk status monitoring unit 36.

Hence when the standard transit trunk is released from congestion, the standard transit trunks can be turned back sequentially from the backup transit trunk. Hence there is an advantage in that since the use frequency of the backup transit trunks is saved, the standard transit trunks can be effectively used in communications.

Figure 19:
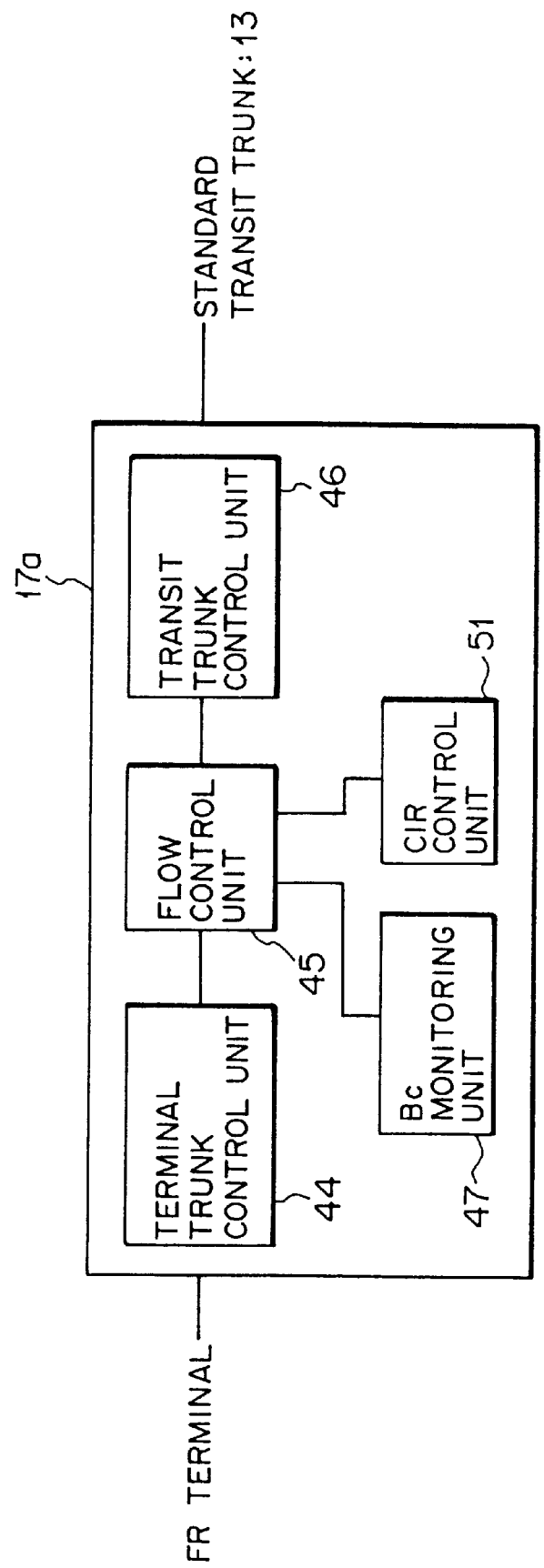
FIG. 19 is a functional block diagram used for explaining the CIR value variable control by the transmitting node in the frame relay communication system according to the present embodiment.

(h) CIR value variable control by transmitting node:

FIG. 19 is a functional block diagram used for explaining the CIR value variable control by the transmitting node in the frame relay communication system according to the present embodiment. As shown in FIG. 19, the node 17a includes the terminal trunk control unit 44, the flow control unit 45, the transit trunk control unit 46, the Bc monitoring unit 47, and the CIR control unit 51.

The Bc monitoring unit (congestion status detecting means) 47 monitors Bc (burst size) and saves the Bc use-rate during the period Tc (committed rate measuring time) into a memory.

The flow control unit 45 checks whether CIR of the corresponding trunk has a value using effectively the physical trunk rate, in response to a report from the Bc monitoring unit 47, and requests a change in the CIR value to the CIR control unit 51.

Bc (committed burst size) is decided at a call setting time and means the maximum committed data that can be transmitted to a network during the period Tc by a user.

The flow control unit 45 and the CIR control unit 51 provide committed information rate varying means that varies CIR defined by the terminal trunk when it is judged the standard transit trunk 13 is nearly in a congestion status, based on the detection information from the Bc monitoring unit 47.

The terminal trunk control unit 44 and the transit trunk control unit 46 have the same functions as those described above.

In the above configuration, the concrete example of the CIR value varying control of the transmitting node according to the present embodiment will be described below with reference to FIGS. 20 and 21.

Figure 20:
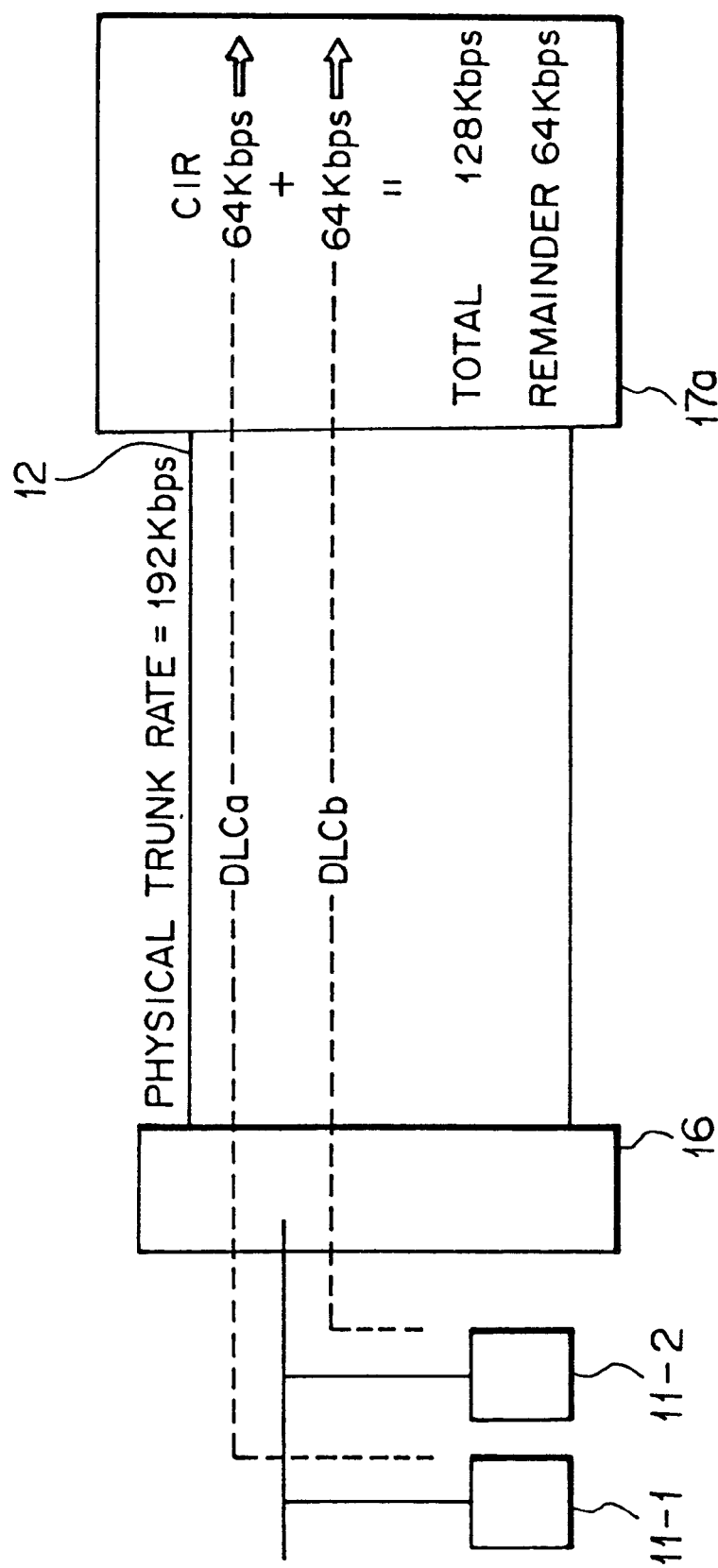
FIG. 20 is a block diagram used for explaining an example of the CIR value variable control by the transmitting node according to the present embodiment.

In the frame relay communication system shown in FIG. 20, the node 17a is connected to the frame relay terminal 11-1 (data link identification information: DLCa) and the frame relay terminal 11-2 (data link identification information: DLCb) via the terminal trunk 12 and the router 16.

The physical trunk rate of the terminal trunk 12 is 192 Kbps. The CIR in the DLCa is defined as 64 Kbps at the registration time of the frame relay terminal 11-1 to the node 17a and the CIR in the DLCb is defined as 64 Kbps at the registration time of the frame relay terminal 11-2 to the node 17a. The burst size Bc is defined as 8 Kbytes.

That is, data is guaranteed within the transfer rate defined with CIR. However, the total CIR of the data link identification information DLCa and DLCb is 128 Kbps being insufficient to the terminal trunk 12 with a physical trunk capability of 192 Kbps.

In order to use effectively the physical trunk capability, the node 17a performs a variable control to bring the total CIR of the terminals 11-1 and 11-2 to the physical trunk rate (192 Kbps).

Figure 21:
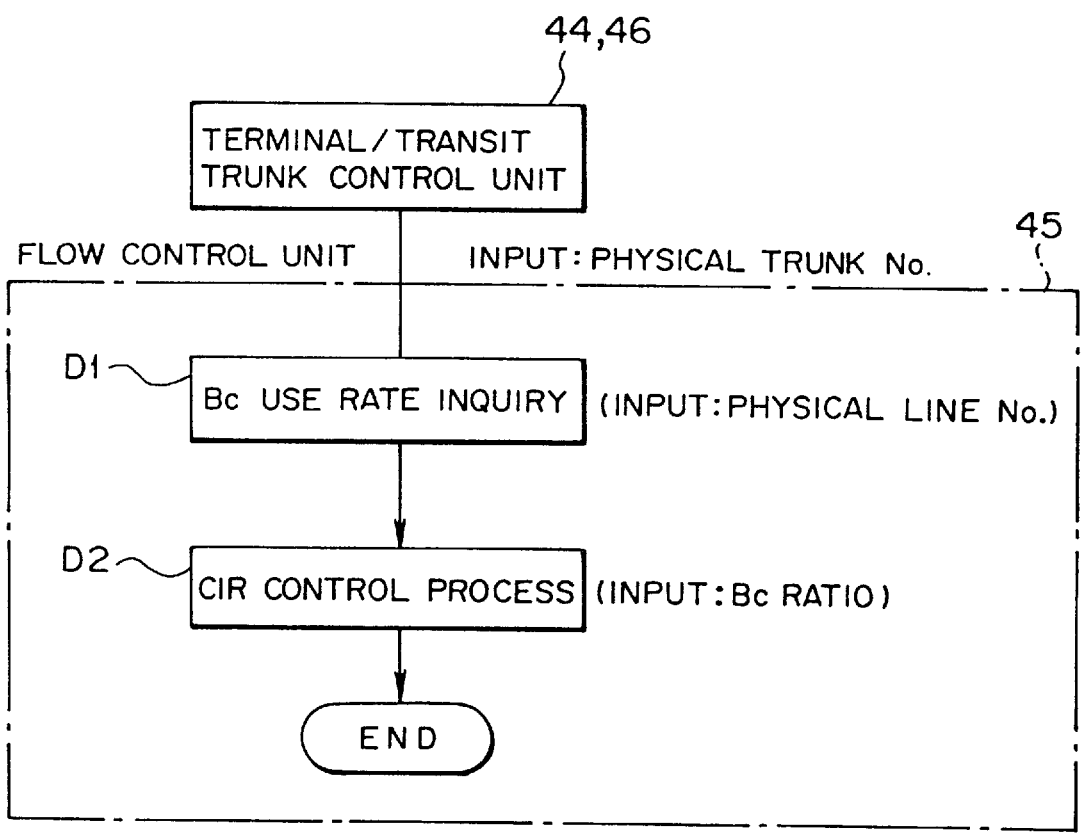
FIG. 21 is a flowchart used for explaining an example of the CIR value variable control by the transmitting node according to the present embodiment.

As shown in FIG. 21, the flow control unit 45 calculates the use amount of Bc (committed burst size) decided in subscriber unit within the committed rate measuring time Tc. The Bc ratio in physical trunk unit is calculated based on the Bc use amount obtained (step D1).

The committed rate measuring time Tc is calculated as 1 second as expressed by the following formula (1). According to the calculation by the Bc monitoring unit 47, the burst size Bc during Tc (1 second) in DLCa is 4 Kbytes and the burst size Bc during 1 second in DLCb is 4 Kbytes. Hence the Bc ratio is 1:1.

$$Tc = Bc \times 8 / CIR \qquad (1)$$
$$= 8 \times 8 / 64$$
$$= 1$$

The flow control unit 45 reports the Bc ratio to the CIR control unit 51. The CIR control unit 51 increases the CIR of each subscriber by distributing the remaining (192−128= 64 Kbps) of the physical trunk rate in the terminal trunk 12 in the ratio of 1:1 (step D2).

The CIR control unit 51 controls to set the CIR of the frame relay terminal 11-1 to 96 Kbps and the CIR of the frame relay terminal 11-2 to 96 Kbps.

There is an advantage in that since the CIR defined by the terminal trunk 12 can be varied by means of the combination of the flow control unit 45, the Bc monitoring unit 47, and the CIR control unit 51, the terminal trunk 12 can be effectively used.

Figure 22:
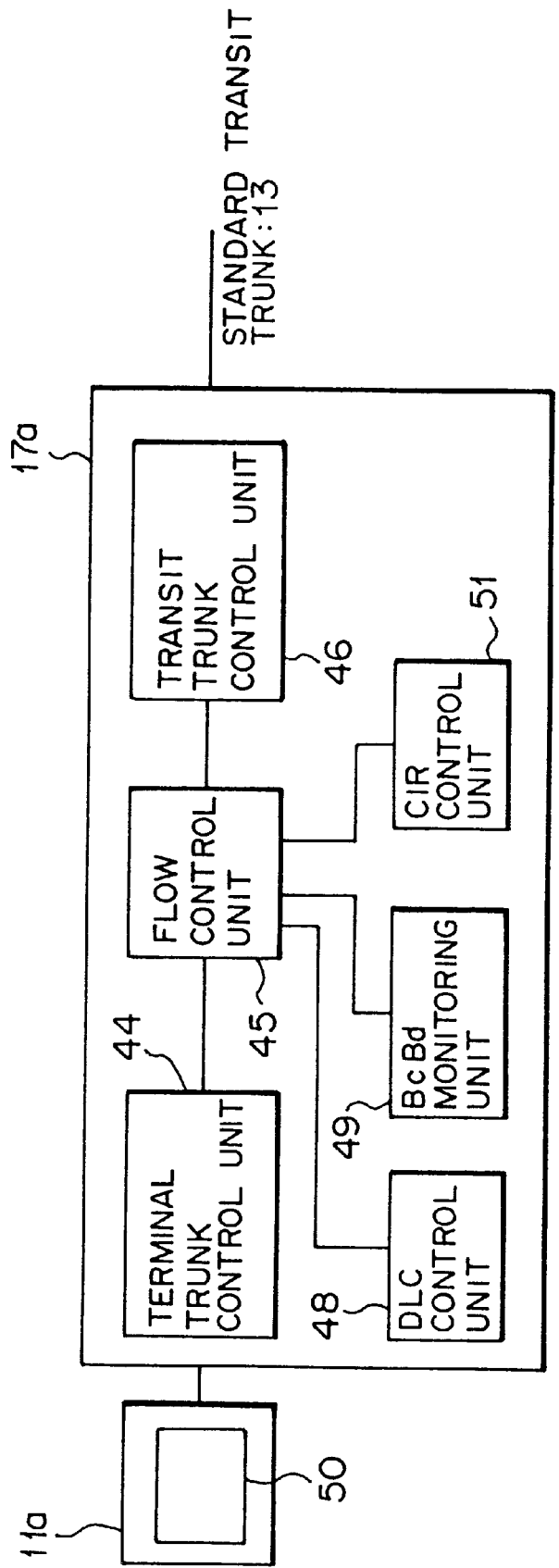
FIG. 22 is a functional block diagram used for explaining the reporting process to the frame relay terminal when a flow parameter is changed by the transmitting node in the frame relay communication system, according to the present embodiment

(i) Process in which a transmitting node reports a change in flow parameter to a terminal:

FIG. 22 is a functional diagram used for explaining the report process to the frame relay terminal 11a in the case where the transmitting node 17a in the frame relay communication system according to the present embodiment varies the flow parameters for CIR, Bc, Bd, Be, and the like. As shown in FIG. 22, the node 17a includes the terminal trunk control unit 44, the flow control unit 45, the transit trunk control unit 46, the DLC control unit 48, the BcBd monitoring unit 49, and the CIR control unit 51.

The flow parameter Bd is a threshold value used to report a congestion status to the frame relay terminal 11a at a congestion detecting time in a network, and the Be is a standard value for a frame discard. Bd is decided to satisfy the relation of Bc≦Bd≦Be.

The BcBd monitoring unit 49 monitors the flow parameters Bc and Bd. The CIR control unit 51 varies the flow parameter CIR, as described in the item (h).

The DLC control unit 48 prepares a flow parameter notification frame used to report a changed flow parameter to the frame relay terminal 11*a*.

In the flow parameter notification frame, the terminal DLC number as well as varied values of CIR, Bc, Bd, or the like are set in the data portions and the control DLC numbers for fixing the system are set in the address portions.

The terminal frame transmission processing unit 39 (refer to FIG. 4) in the terminal trunk control unit 44 refers to the DLC number of the address portion in a frame and then transmits quickly the corresponding frame to the frame relay terminal 11*a* if the system fixing control DLC number exists in the flow parameter notification frame.

If the DLC number of an address portion is a number other than the system fixing control DLC number, the remote DLC number is decided based on the originating DLC number. After the remote DLC number has been set to the address portion, a frame is transmitted to the frame relay terminal 11*a*.

When the terminal receives a flow parameter notification frame, the DLC number in the data portion is referred if the DLC number in the address portion is for the system. If the DLC number of the address portion is the self DLC number, each flow parameter is captured and then a response is sent out. If the DLC number of the address portion is not the self DLC number, each flow parameter is discarded.

Moreover, the frame relay terminal 11*a* is connected to the node 17*a* via the router 16. The frame relay terminal 11*a* includes a flow control unit (flow control means) 50 that executes a flow control according to the flow parameter notified by receiving a flow parameter notification frame.

The flow control unit 50 controls to define a maximum throughput before a notification of congestion and to communicate with the maximum throughput at a normal time. The flow control unit 50 also controls to reduce stepwise the throughput in response to the congestion notification and drop sharply the throughput to communicate when a frame discard is detected.

In the above configuration, the notifying process to the frame relay terminal 11*a* in the case where the transmitting node 17*a* in the frame relay communication system according to the present embodiment varies flow parameters such as CIR, Bc, Bd, Be will be explained below with reference to FIGS. 23 to 26.

Figure 23:
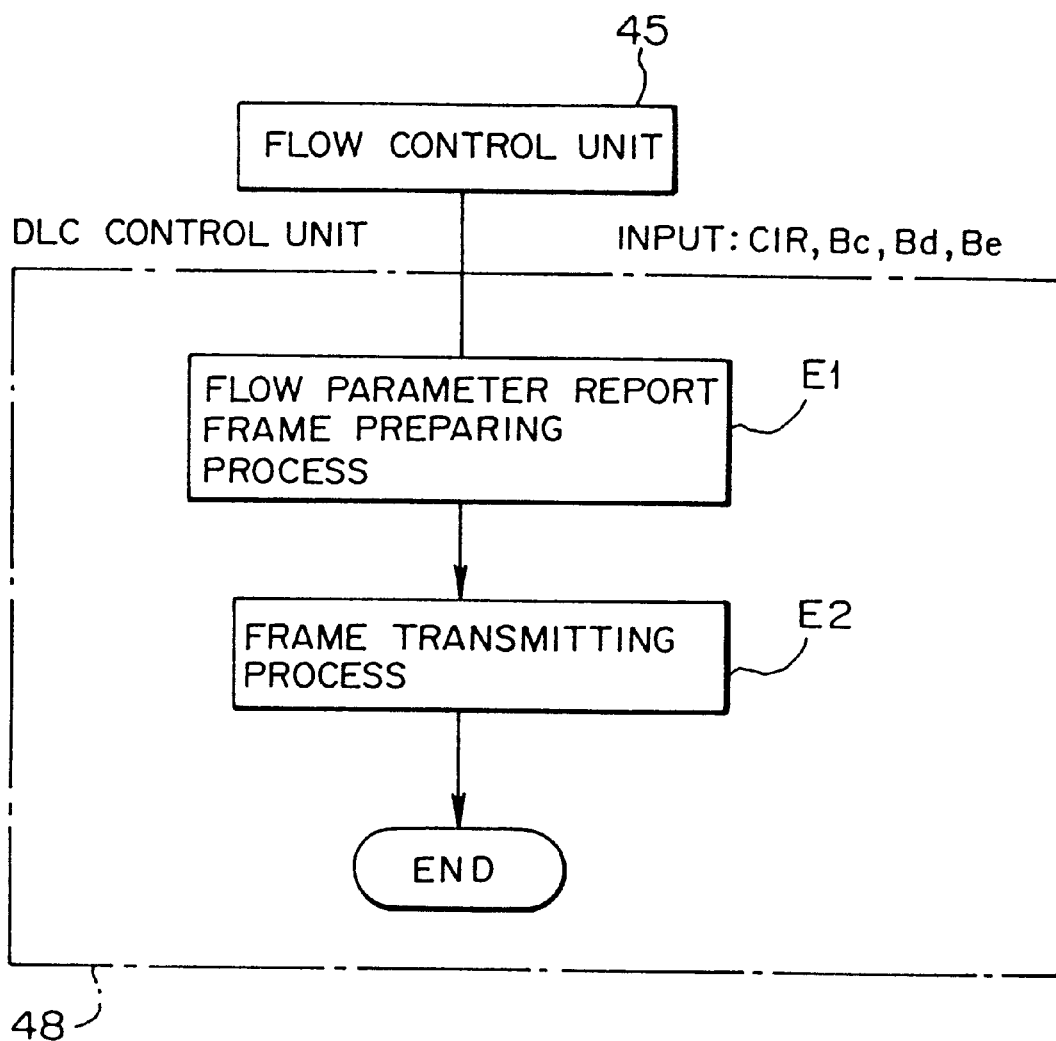
FIG. 23 is a flow chart used for explaining the reporting process to the frame relay terminal when a flow parameter is changed by the transmitting node in the frame relay communication system, according to the present embodiment.
Figure 24:
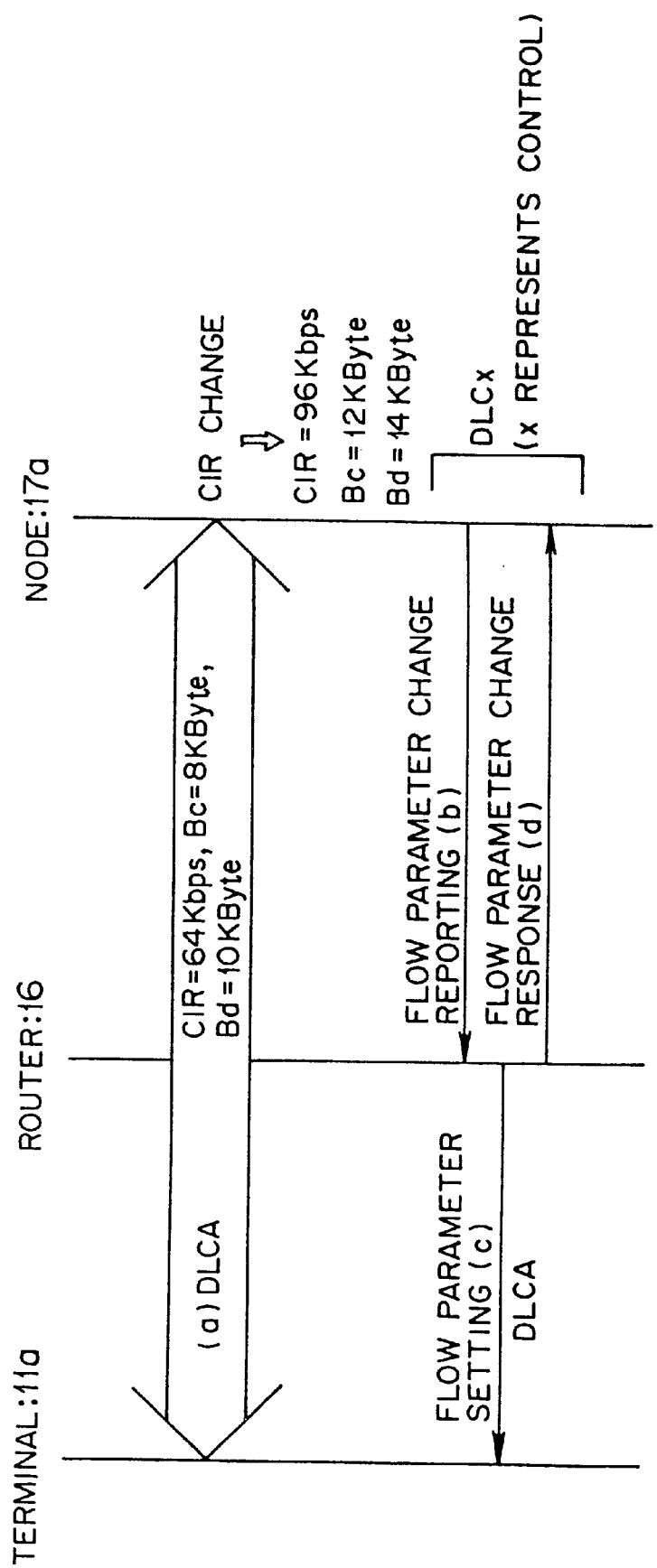
FIG. 24 is a signal sequence diagram used for explaining the reporting process to the frame relay terminal when a flow parameter is changed on the transmitting side in the frame relay communication system, according to the present embodiment.
Figure 25:
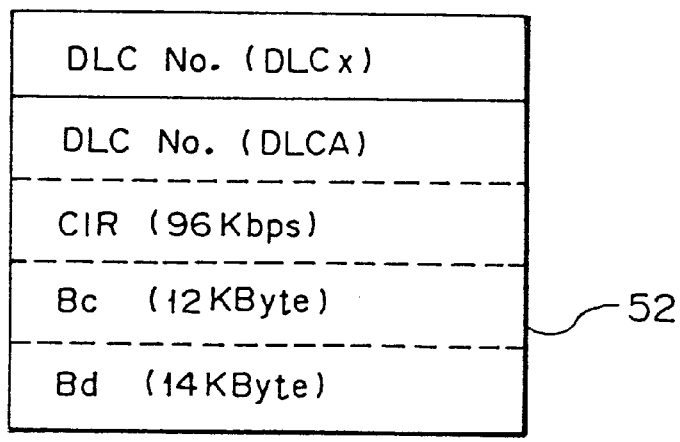
FIG. 25 is a diagram showing the format of a flow parameter report frame transferred to the terminal according to the present embodiment.

That is, when communications between the frame relay terminal 11*a* and the node 17*a* is performed with DLCA having flow parameters corresponding to CIR=64 Kbps, Bc=8 Kbytes, and Bd=10 Kbytes (refer to (a) in FIG. 24), the DLC control unit 48 creates the flow parameter notification frame 52 when the flow parameter in the node 17*a* is changed to CIR=96 Kbps, Bc=12 Kbytes, Bd=14 Kbytes, as shown in FIG. 25 (step E1 in FIG. 23).

The flow parameters of the terminal 11*a* are varied (refer to b and c in FIG. 24) by transmitting the created flow parameter notification frame 52 with the control DLC number fixed in the system (step E2 in FIG. 23).

Figure 26:
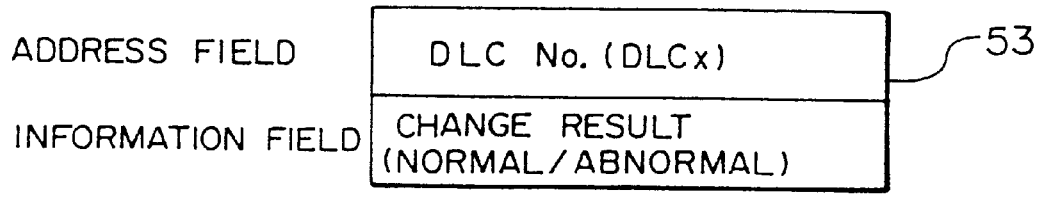
FIG. 26 is a diagram showing the format of a flow parameter change response frame according to the present embodiment.

Thereafter, when the router 16 transmits the flow parameter change response frame 53 to the node 17*a*, as shown in FIG. 26, the flow parameter change notification is completed.

Therefore, there is an advantage in that the throughput can be fully used by notifying the frame relay terminal 11*a* of the flow parameter by the flow parameter notification frame.

According to the present embodiment, the frame relay terminal is connected via the router 16. However, the frame relay terminal may be connected via, for example, a bridge, without being limited only by the above embodiment.

Figure 27:
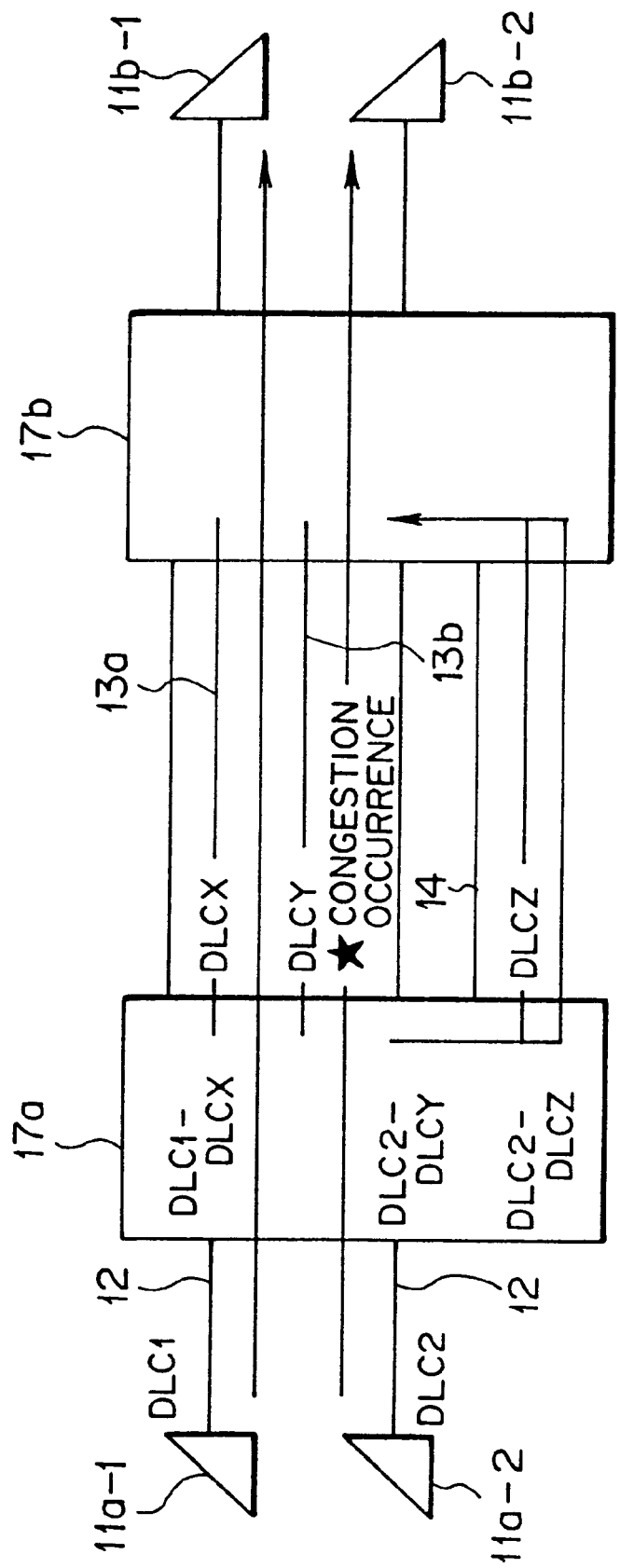
FIG. 27 is a block diagram used for explaining an alternate transfer process when plural standard transit trunks are prepared in the frame relay communication system, according to the present embodiment.

(j) Alternate transfer process when plural standard transit trunks are prepared in the frame relay communication system according to the present embodiment:

FIG. 27 is a block diagram used for explaining the alternate transfer process in the case where plural standard transit trunks are arranged in the frame relay communication system according to the present embodiment. As shown in FIG. 27, two transmitting frame relay terminals 11*a*-1 and 11*a*-2, each having a DLC number (respectively DLC1 and DLC2), are connected to the node 17*a*.

The node 17*a* is connected to the node 17*b* via plural (e.g. 2) standard transit trunks 13*a* and 13*b* and the backup trunk 14, each having a DCL number (corresponding to DLCX, DLCY, and DLCZ respectively).

The node 17*b* is connected to the receiving frame relay terminals 11*b*-1 and 11*b*-2.

Figure 28:
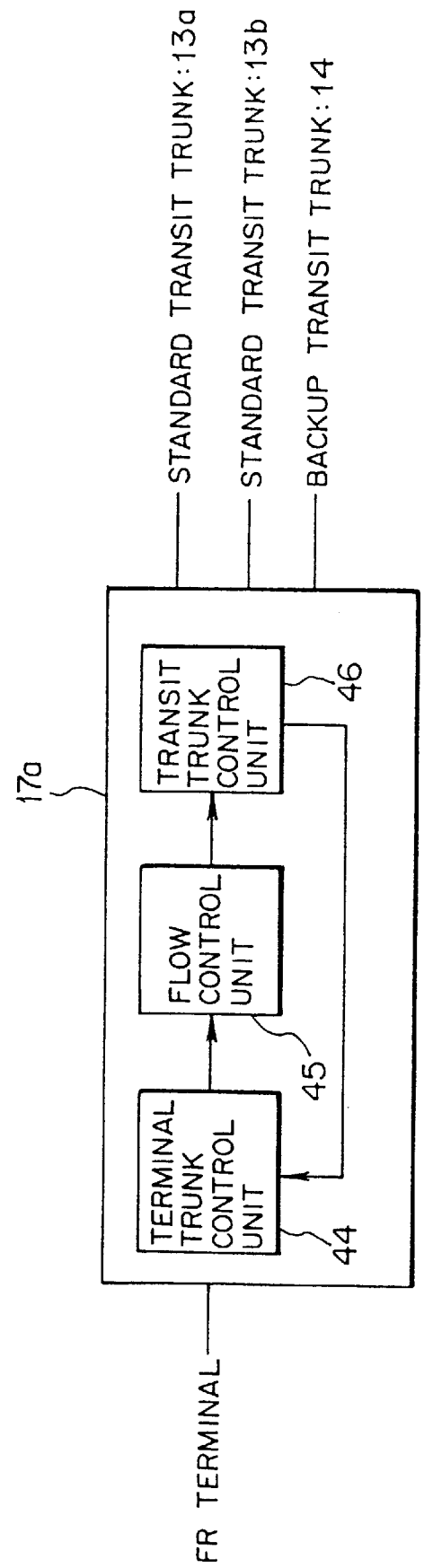
FIG. 28 is a functional block diagram used for explaining an alternate transfer process by the transmitting node according to the present embodiment, with plural standard transit trunks prepared.

FIG. 28 is a functional block diagram used for explaining the alternate transfer process of the transmitting node 17*a* connected to plural standard transit trunks 13*a* and 13*b*. As shown in FIG. 28, the node 17*a* includes the terminal trunk control unit 44, the flow chart unit 45, and the transit trunk control unit 46.

The transit trunk control unit 46 receives a frame sent from the terminal trunk 12, hunts a DLC in the trunk by selecting a frame-transmitting transit trunk among the standard transit trunks 13*a* and 13*b* and the backup transit trunk 14, and then links the DLC to the terminal trunk DLC.

The transit trunk status monitoring unit 36 (refer to FIG. 4) in the transit trunk control unit 46 monitors congestion in the transit trunk every DLC (DLCX, DLCY, or DLCZ).

For example, as shown in FIG. 27, when DLC1 sent from the terminal trunk 12 is hunted, it can be linked to DLCX as the standard transit trunk 13*a*. When DLC2 sent from the terminal trunk 12 is hunted, it can be linked to DLCY as the standard transit trunk 13*b*.

When congestion occurs in DLCX as the standard transit trunk 13*a*, the transit trunk control unit 46 hunts newly DLC among other standard transit trunks or the backup transit trunks 13*b* and 14 links the DLC to the DLC1 sent from the terminal trunk 12.

In this case, DLCX as a network DLC linked with the DLC1 of the frame relay terminal 11*a*-1 can be linked to the DLCY as the standard transit trunk 13*b*.

Figure 29:
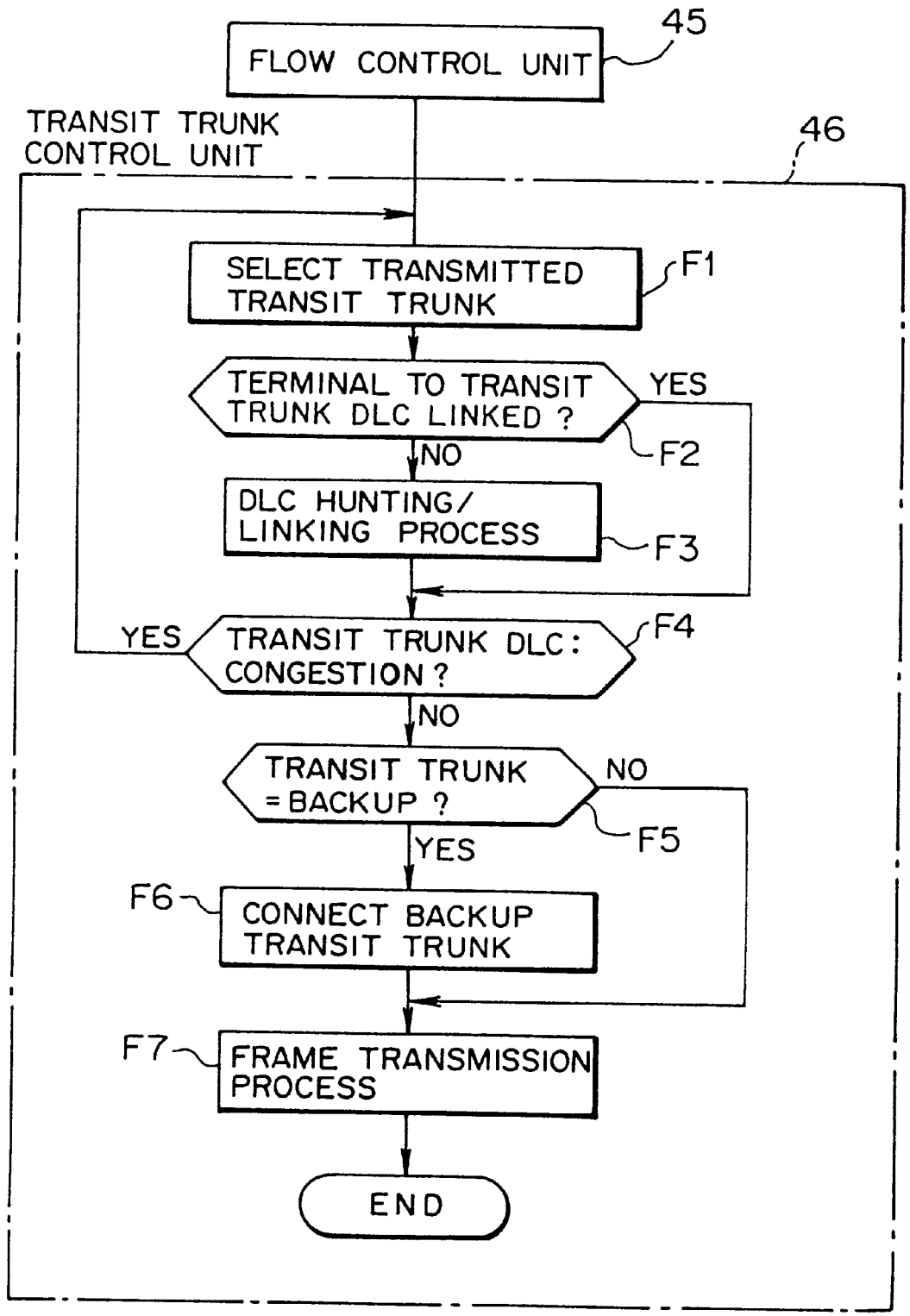
FIG. 29 is a flowchart used for explaining an alternate transfer process, with plural standard transit trunks prepared, in the frame relay communication system according to the present embodiment.

In the above configuration, in the frame relay communication system according to the present embodiment, the alternate transfer process in the case of plural standard transit trunks prepared will be explained below using the flowchart shown in FIG. 29.

When the transit trunk control unit 46 transmits a frame, a destination transit trunk is first selected among the standard transit trunks 13*a* and 13*b* and the backup transit trunk 14 (step F1).

The DLC in a selected transit trunk is hunted. If the DLC is not linked to the DLC of the terminal trunk 12, linking is performed (step F2 to step F3 via NO route).

In the process in the steps F1 to F3, when the selected DLC is linked with the DLC of the terminal trunk 12, it is judged whether the transit trunk is in a congestion status (step F4).

In this case, if the transit trunk is in congestion status, the destination transit trunk is selected again (step F4 to step F1 via YES route). If no congestion status is found (NO route in step F4), a frame transmission process is performed by connecting a predetermined transit trunk.

In other words, where the transit trunk corresponds to the backup transit trunk 14, a frame transmitting process is performed by connecting the backup transit trunk 14 (from step F5 to steps F6 and F7 via YES route). If the transit trunk is not the backup transit trunk 14, a frame transmitting process is performed using the standard transit trunk 13a or 13b (from step F5 to step F7 via NO route).

Hence the routing control discriminates between congestion of DLC and the status of a transit trunk. When congestion, for example, occurs in the standard transit trunk 13a, a frame can be transmitted to the other standard transit trunk 13b in the same route, without performing an alternate transfer process to the backup transit trunk 14.

Hence, according to the present embodiment, there is an advantage in that since only frames from a terminal with heavy communication load can be bypassed, a communication flow control can be performed without influencing other communications.

(k) Return control to the original standard transit trunk in the frame relay communication system according to the present embodiment:

Where an alternate transfer process is performed in the frame relay communication system including plural standard transit trunks, the return control to the original standard transit trunk is performed as follows.

Figure 30:
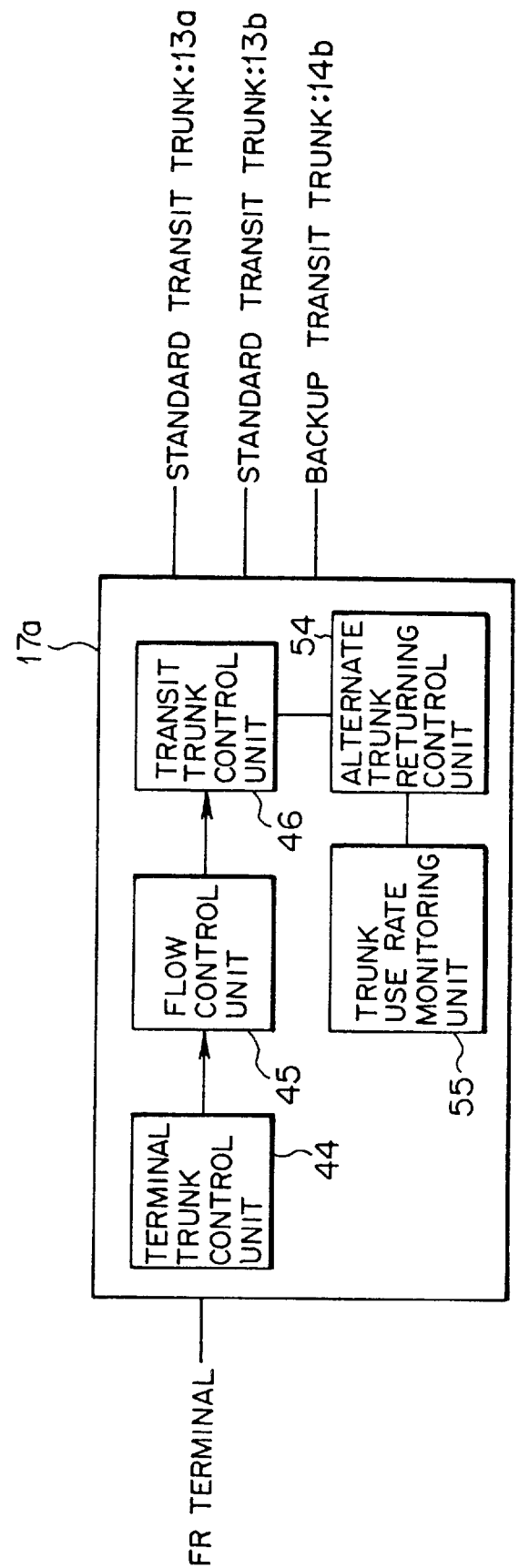
FIG. 30 is a functional block diagram used for explaining a process of switching an alternate trunk in the transmitting node to the original line, according to the present embodiment.

FIG. 30 is a functional block diagram used for explaining the process in which the alternate trunk in the transmitting node 17a is returned to the original trunk. As shown in FIG. 30, the node 17a includes the terminal trunk control unit 44, the flow control unit 45, the transit trunk control unit 46, the alternate trunk return control unit 54, and the trunk use-rate monitoring unit 55.

When the trunk use-rate of the standard transit trunk 13a or 13b acting as the original trunk is less than the specified value α, the transit trunk control unit 46 judges that the congestion has been removed, thus reporting the fact to the alternate trunk return control unit 54.

Moreover, the trunk use-rate monitoring unit (trunk use-rate monitoring means) 55 monitors the trunk use-rate of the standard transit trunk 13a or 13b or backup trunk 14 acting as an alternate trunk. The trunk use-rate monitoring unit 55 has the function of the transit status monitoring unit 36 shown in FIG. 4.

In response to a report saying that congestion in the standard transit trunk 13a or 13b has been removed from the transit trunk control unit 46, the alternate trunk return control unit (return transfer means) 54 receives the trunk use-rate of the standard transit 13a and 13b or the backup trunk 14 from the trunk use-rate monitoring unit 55. Where the trunk use-rate of an alternate trunk is smaller than the specified value (e.g. β), the transfer route is returned from the alternate trunk to the originating trunk. The alternate trunk return control unit 54 has the function of the routing control unit 35 shown in FIG. 4.

In other words, when receiving reports saying that the congestion status of the standard transit trunk 13a or 13b has been removed from the transit trunk control unit 46, provided that the trunk use-rate is smaller than the specified value β, the alternate trunk return control unit 54 transfers data after returning the route to the original standard transit trunk, based on the trunk use-rate information from the trunk use-rate monitoring unit 55.

The terminal trunk control unit 44 corresponds functionally to the before-mentioned terminal trunk control unit while the flow control unit 45 corresponds to the before-mentioned flow control unit.

As to the threshold values α and β, (α+β) is set to a rate less than each of the original standard transit trunks 13a and 13b. When the standard transit trunks 13a and 13b are different from the backup transit trunk 14 in trunk rate, it is necessary to convert the value into the trunk use-rate at the trunk rate of each of the standard transit trunks 13a and 13b.

Figure 31:
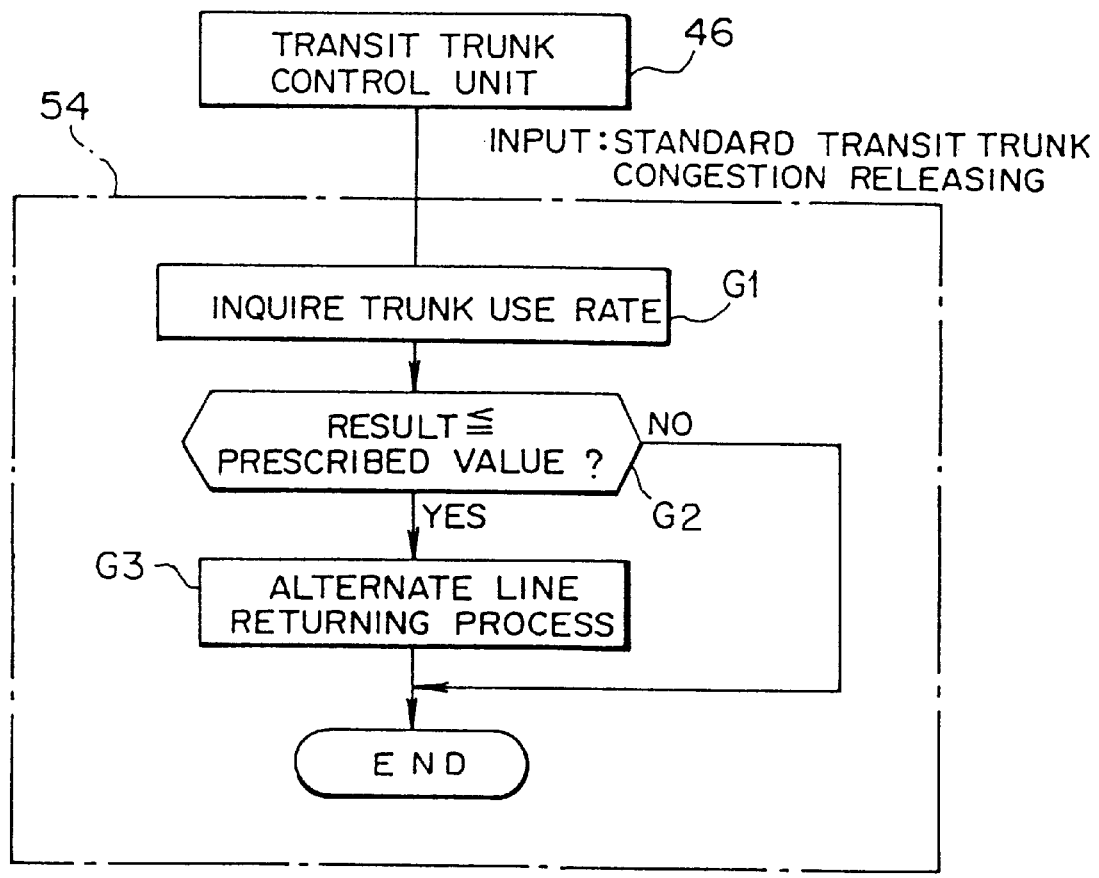
FIG. 31 is a flowchart used for explaining the switching control operation to the original standard transit trunk in the frame relay communication system, according to the present embodiment.

In the frame relay communication system with the above-mentioned configuration according to the present embodiment, the operation of a return control to the original standard transit trunk will be explained below with reference to the flowchart shown in FIG. 31.

That is, when congestion is removed with the trunk use-rate of each of the standard transit trunks 13a and 13b less than the specified value α, the transit trunk control unit 46 reports the fact to the alternate trunk return control unit 54. The alternate trunk return control unit 54 inquires the trunk use-rate from the trunk use-rate monitoring unit 55 in response to the congestion releasing notification (step G1).

When the trunk use-rate of an alternate trunk sent from the trunk use-rate monitoring unit 55 is larger than, for example, the specified value β, the route is not returned to each of the standard transit trunk 13a or 13b being the original trunk (NO route in step G2). When the trunk use-rate is smaller than the specified value β, data is transferred by returning the route from the alternate trunk to each of the standard transit trunk 13a or 13b (step G3).

As described above, when congestion is removed from the standard transit trunk and the trunk use-rate of an alternate trunk becomes sufficiently small, the route can be returned to the standard transit trunks 13a and 13b. Hence even if the route is returned from the alternate trunk to the standard transit trunk, the possibility that congestion occurs in the standard transit trunk is small. There is an advantage in that the frame loss due to repeated congestion can be suppressed at minimum.

Figure 32:
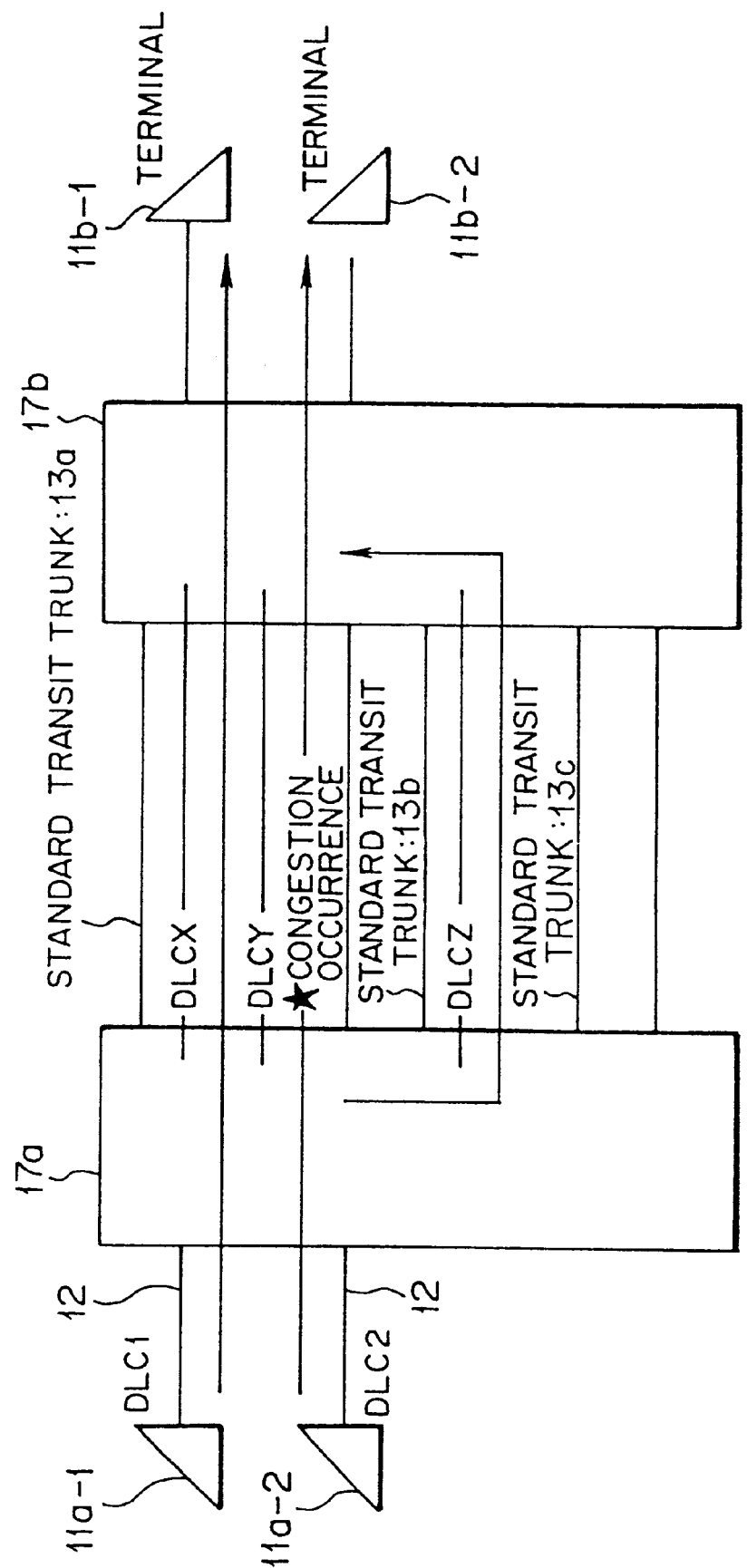
FIG. 32 is a block diagram used for explaining an alternate transfer process to the transit trunk with low trunk use rate, with plural standard transit trunks prepared, in the frame relay communication system according to the present embodiment.

(l) Alternate transfer process to a transit trunk with low trunk use-rate where the frame relay communication system according to the present embodiment includes plural standard transit trunks:

FIG. 32 is a block diagram used for explaining the alternate transfer process to the transit trunk with a low trunk use-rate in the case where the frame relay communication system according to the present embodiment includes plural standard transit trunks.

The frame relay communication system shown in FIG. 32 differs from that shown in FIG. 27 in that the node 17a can perform an alternate transfer process to a transit trunk with low trunk use-rate.

Referring to FIG. 32, two transmitting frame relay terminals 11a-1 and 11a-2 having DLC numbers (DLC1 and DLC2) respectively are connected to the node 17a.

The node 17a is connected to the node 17b via plural (e.g. 3) standard transit trunks 13a to 13c and the backup trunk 14. DLCX and DLCY are attached as the DLC numbers to the standard transit trunk 13a. DLCZ is attached as the DLC number to the standard transit trunk 13b.

The receiving frame relay terminals 11b-1 and 11b-2 are connected to the node 17b.

Figure 33:
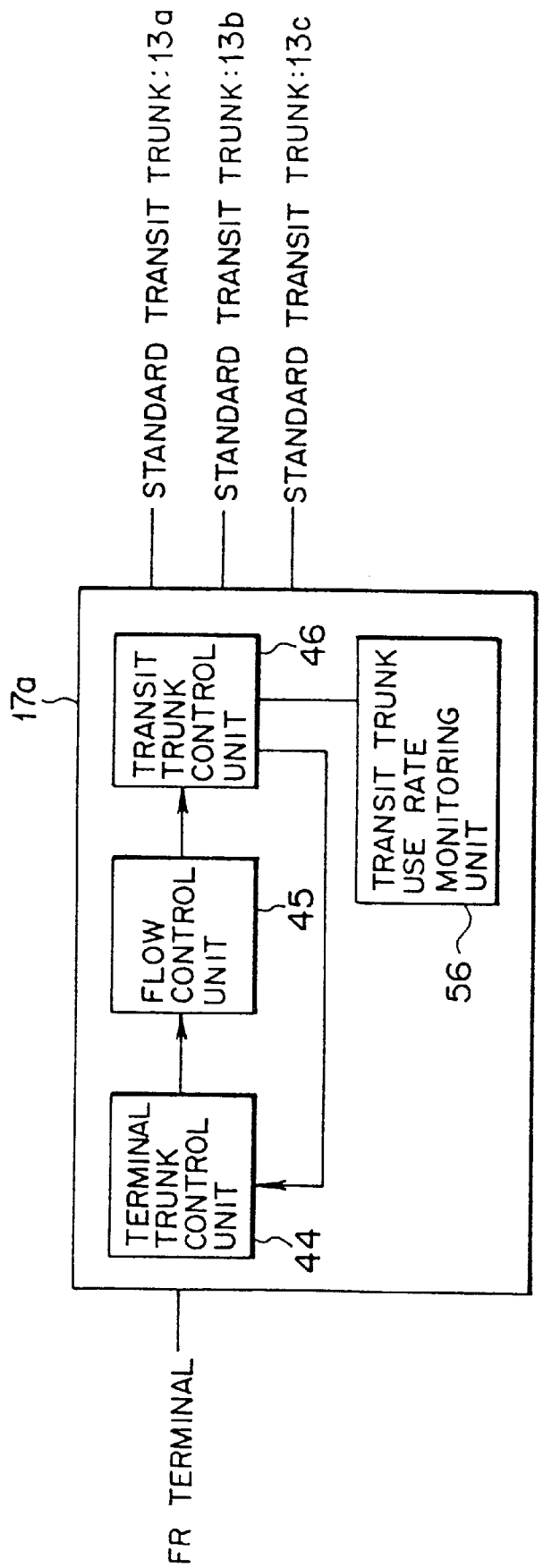
FIG. 33 is a functional block diagram used for explaining an alternate transfer process to a transit trunk with low trunk use rate in the transmitting node.

FIG. 33 is a functional block diagram used for explaining the alternate transfer process to a transit trunk with a low trunk use-rate by the transmitting node 17a. As shown in FIG. 33, the transmitting node 17a includes the terminal trunk control unit 44, the flow control unit 45, the transit trunk control unit 46, and the transit trunk use-rate monitoring unit 56.

The transit trunk use rate monitoring unit 56 monitors the trunk use rate of the standard transit trunks 13a to 13c and functions similarly as the transit trunk status monitoring unit 36 shown in FIG. 4.

The terminal trunk control unit 44, the flow control unit 45, and the transit trunk control unit 46 have the same function as the corresponding elements shown in FIG. 28, respectively.

Figure 34:
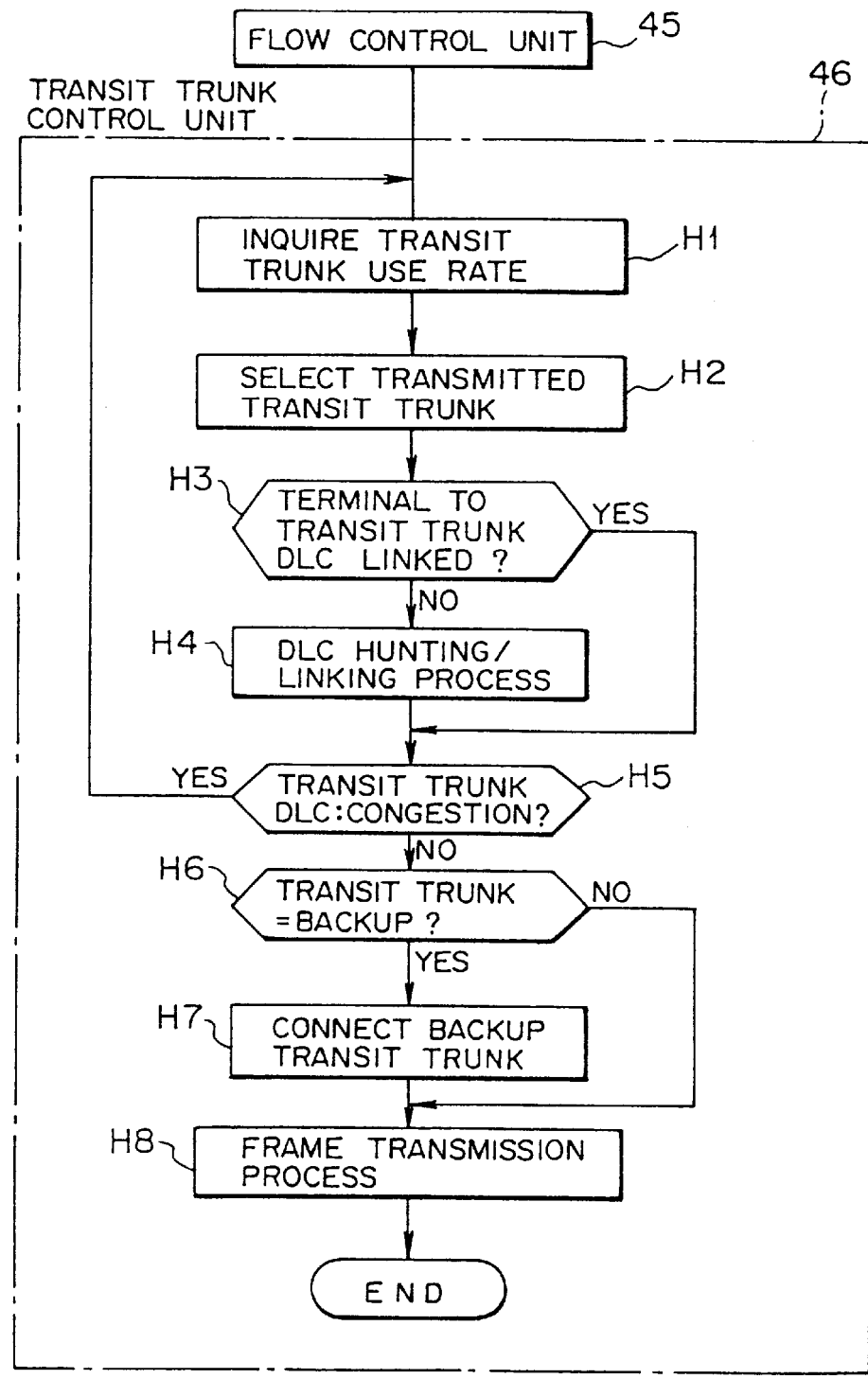
FIG. 34 is a flowchart used for explaining the operation of an alternate transfer process to the transit trunk with low trunk use rate, with plural standard transit trunks prepared, in the frame relay communication system according to the present embodiment.

As to the frame relay communication system according to the present embodiment including plural standard transit trunks, the operation of the alternate transfer process to a transit trunk with a low trunk use-rate will be explained below with reference to the flowchart shown in FIG. 34.

When the transit trunk control unit 46 transmits a frame, provided that congestion occurs in the standard transit trunk 13a, the transit trunk control unit 46 inquires first the trunk use-rate of each of the standard transit trunks 13b and 13c from the transit trunk use-rate monitoring unit 56 (step H1) and selects the standard transit trunk with the lowest trunk use-rate among the standard transit trunks 13b and 13c (step H2).

As shown in FIG. 32, with the standard transit trunk 13b having the trunk use rate of 50% and the standard transit trunk 13c having the trunk use rate of 80%, the transit trunk use-rate monitoring unit 56 selects the standard transit trunk 13b with the lowest trunk use-rate.

The transit trunk use-rate monitoring unit 56 hunts DLC (in this case, DLCZ) of a selected transit trunk, and performs the linking process if the DLC is not linked with DLC of the terminal trunk 12 (from step H3 to step H4 via NO route).

When the selected DLC has been linked with DLC of the terminal trunk 12 in the steps H1 to H4, it is judged whether the transit trunk is in congestion status (step H5).

When the transit trunk is in a congestion status, the destination transit trunk is selected again (from step H5 to step H1 via YES route). When the transit trunk is not in a congestion status (NO route in step H5), a frame transmission process is performed by connecting the trunk to a predetermined transit trunk.

Where the transit trunk is the backup transit trunk 14, the frame transmitting process is performed by connecting the trunk to the backup transit trunk 14 (from step H6 to steps H7 and H8 via YES route). When the transit trunk is not the backup transit trunk 14, the frame transmitting process is performed by using any one (in this case, the standard transit trunk 13b) of the standard transit trunks 13a to 13c (from step H6 to step H8 via NO route).

As described above, when congestion occurs in a standard transit trunk, the alternate transfer process is performed using another standard transit trunk with the lowest trunk use-rate. Hence there is an advantage in that distributing traffics in the transit network allows the maximum flow so that the communication efficiency can be improved.

Figure 35:
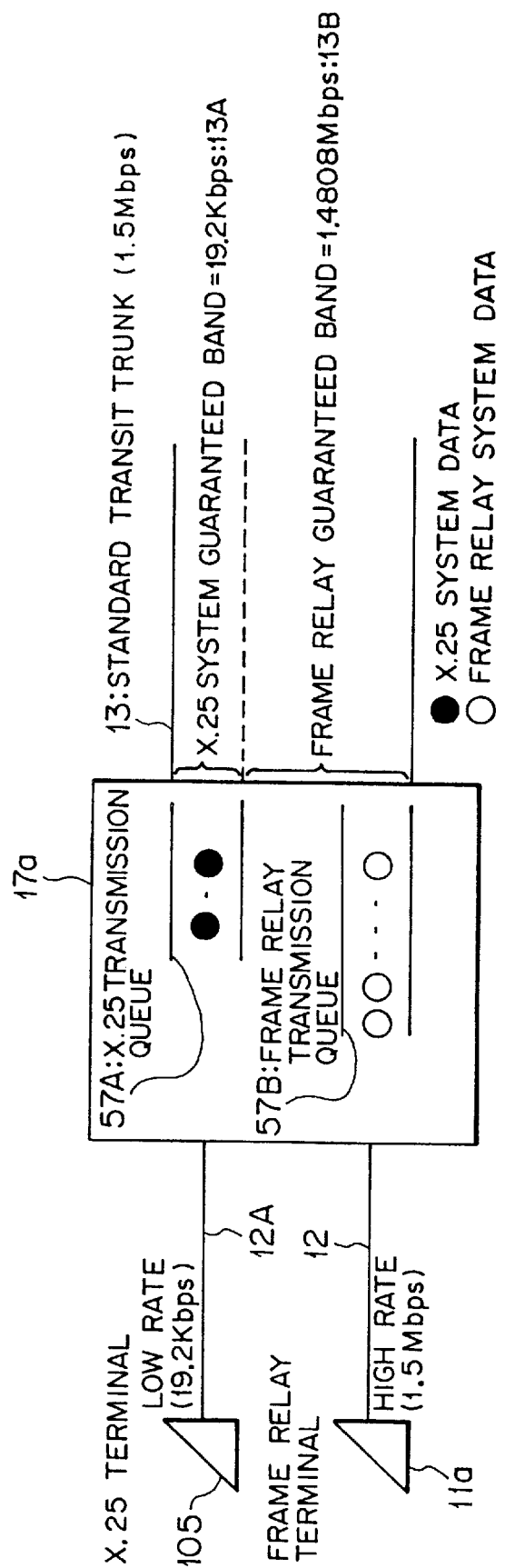
FIG. 35 is a block diagram used for explaining the standard transit trunk used for communication, with the mode divided into the band in a packet system and the band in the frame relay system, in the frame relay communication system according to the present embodiment.

(m) Mode in which communications can be separately established in the band in the packet system and the band in the frame relay system in the standard transit trunk, in the frame relay communication system according to the present embodiment:

FIG. 35 is a block diagram used for explaining the mode in which communications are established with the standard transit trunks divided into the band in the packet system and the band in the frame relay system in the frame relay communication system according to the present embodiment. Referring to FIG. 35, the transmitting node 17a accommodates the frame relay terminal 11a via the high-speed transit trunk 12 (e.g. about 1.5 Mbps) and the X.25 terminal 105 via the low-speed transit trunk 12A (e.g. about 19.2 Kbps).

The node 17a is connected to the standard transit trunk 13 acting as a frame relay transit trunk in the transit system. The standard transit trunk 13 with a transmission speed of 1.5 Mbps is divided into the X.25 system guaranteed band 13A of about 19.2 Kbps and the frame relay guaranteed band 13B of about 1.4808 Mbps.

For communications, the standard transit trunk 13 is divided into two: one being the X.25 system guaranteed band 13B as the band in the packet system and the other being the frame relay guaranteed band 13A as the band in a frame relay system.

Figure 36:
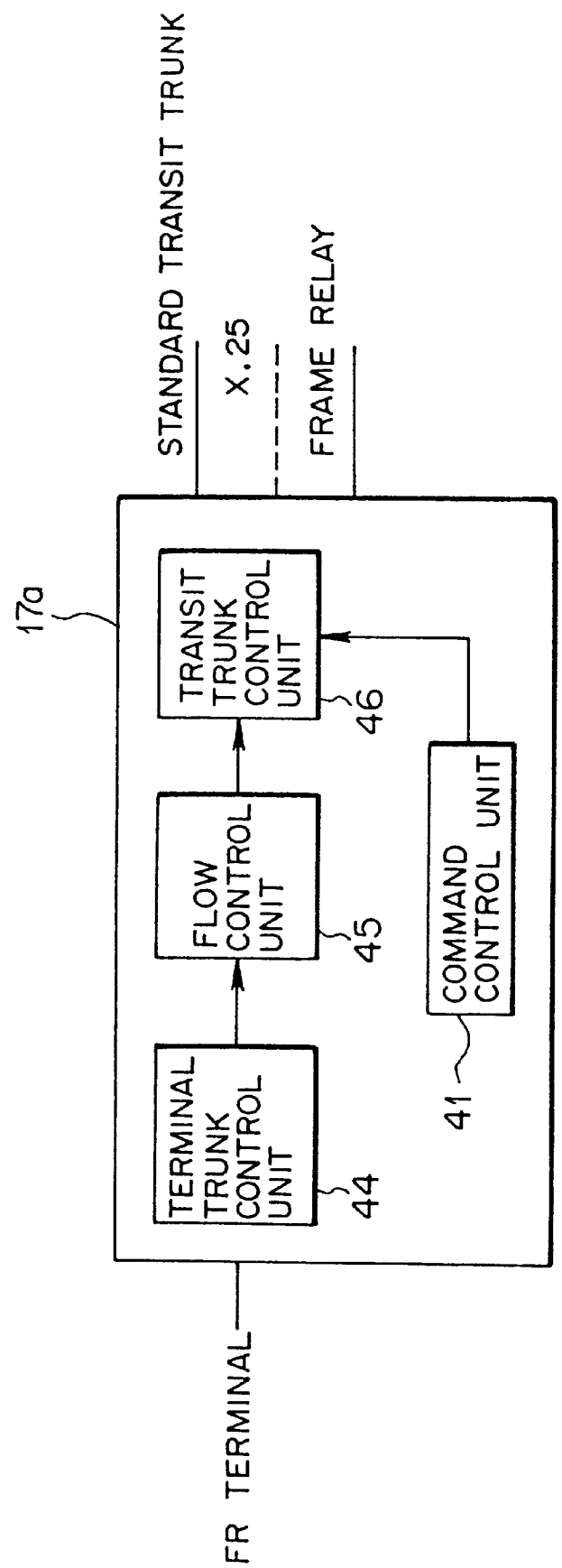
FIG. 36 is a functional block diagram showing the mode in which the node according to the present embodiment is used for communications, with the standard transit trunk separated into the X.25 system guaranteed band and the frame relay guaranteed band.

FIG. 36 is a functional block diagram used for explaining the mode in which the standard transit trunk 13 is divided in the node 17a into two: one being the X.25 system guaranteed band 13A and the other being the frame relay guaranteed band 13B. Referring to FIG. 36, the node 17a includes the terminal trunk control unit 44, the flow control unit 45, the transit trunk control unit 46, and the command control unit 41.

The command control unit 41 set the X.25 system guaranteed band 13A and the frame relay guaranteed band 13B in the standard transit trunk registration time.

The transit trunk control unit 46 judges whether frames to be transmitted relate to the X.25 system or a frame relay system and then divides the frames into the transmission queue 57A in the X.25 system and the transmission queue 57B in the frame relay system, thus connecting them to the transit trunks.

In concrete, in the frame relay control unit 26 (refer to FIG. 4) of the transit trunk control unit 46, when data in the packet system is converted into a frame in a frame relay format, information indicating that data in the frame corresponds to data in a packet system is set in the transit header.

The transit frame editing processing unit 33 of the transit trunk control unit 46 sets to the transit header the fact indicating that data of the frame relay system corresponds to data in the frame relay system.

Figure 37:
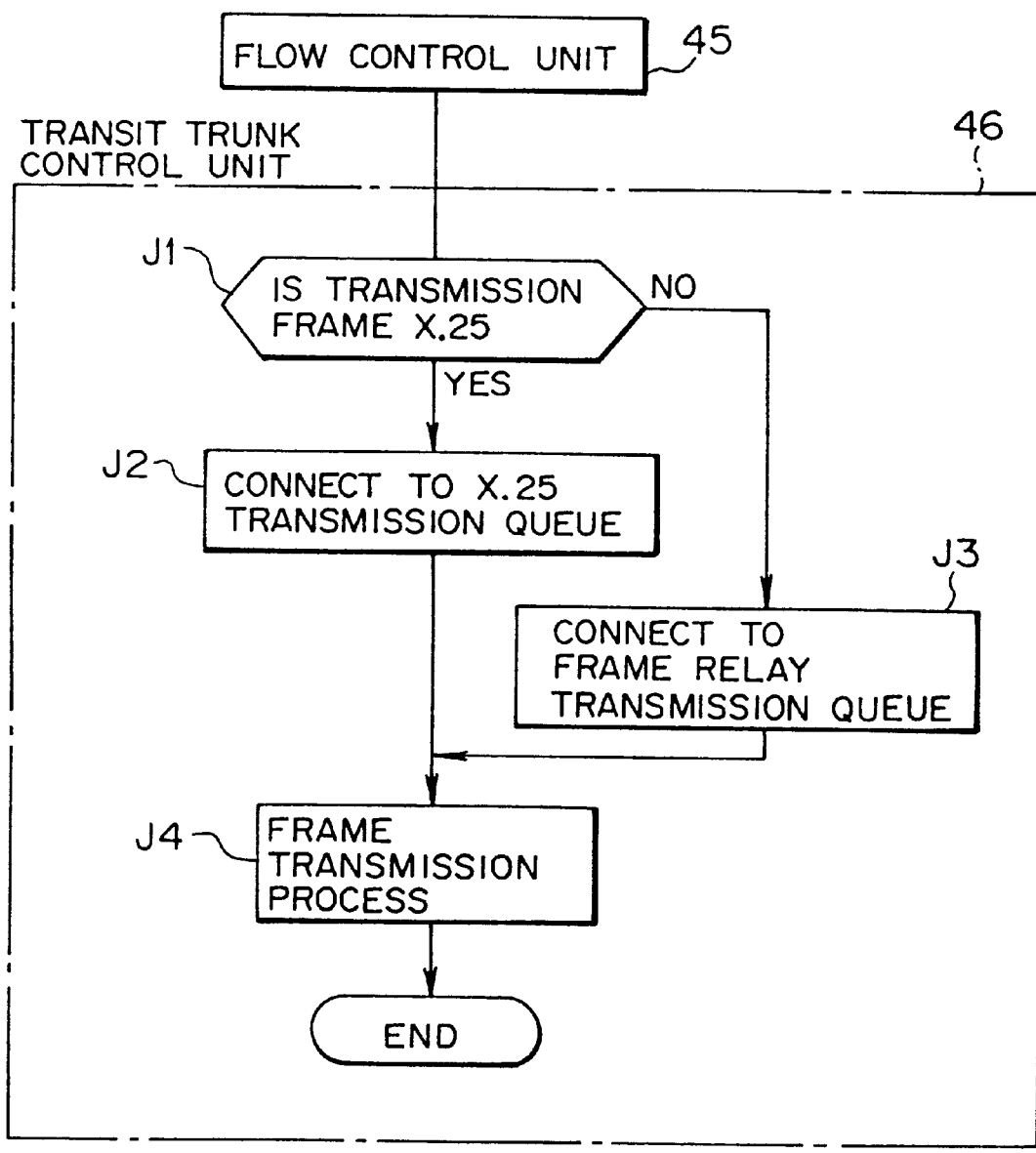
FIG. 37 is a flowchart used for explaining a communication process, with the standard transit trunk separated into the X.25 system guaranteed band and the frame relay guaranteed band, by the node according to the present embodiment.

The destination is decided by the routing process of the routing control unit 35. At the same time, the transit frame transmission processing unit 37 can connect the X.25-system data to the X.25-system transmission queue 57A and the frame relay-system data to the frame relay-system transmission queue is divided into two, one being X.25-system guaranteed band 13A and the other being the frame relay guaranteed band 13B, will be explained below with reference to the flowchart shown in FIG. 37.

That is, the transit trunk control unit 46 receives a frame to be transmitted from the flow control unit 45 and then judges whether the frame to be transmitted relates to the X.25 system or the frame relay system (step J1).

If the frame to be transmitted is a packet being permissible of the X.25 protocol, it is connected to the X.25-system transmission queue 57A (from step J1 to step J2 via YES route). If the frame to be transmitted relates to a frame relay, it is connected to the frame relay-system transmission queue 57B (from step J1 to step J3 via NO route).

The frames connected to the transmission queues 57A and 57B in the steps J1 and J2 are transmitted via the standard transit trunk 13 (step J4).

As described above, according to the present embodiment, communications can be established with the standard transit trunk divided into two, one being the X.25- system guaranteed band 13A and the other being the frame relay guaranteed band 13B. Hence there is an advantage in that the delay which occurs during the X.25 communication can be suppressed.

(n1) First band changing processing mode in which communications is established with the standard transit trunk divided into the band of the packet system and the band in the frame relay system:

As shown in FIG. 35, where communications is made with the standard transit trunk 13 divided into two, one being for the X.25-system guaranteed band 13A and the other being for the frame relay guaranteed band 13B, the command control unit 41 (refer to FIG. 36) sets the band. However, the band can be set based on the congestion status of a transmission queue.

Figure 38:
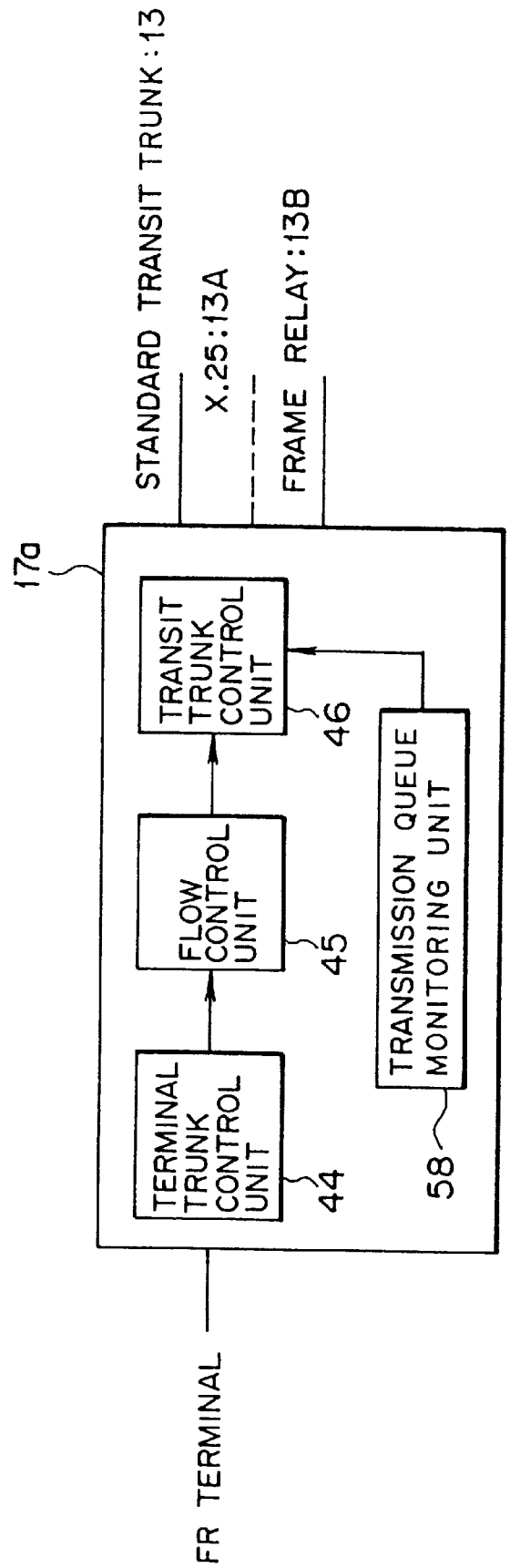
FIG. 38 is a functional block diagram used for explaining a process of setting the band based on the congestion state of a transmission queue, according to the present embodiment.

FIG. 38 is a functional block diagram used for explaining the process in which the band is set based on the congestion status of the transmission queue when the transmitting node 17a according to the present embodiment establishes communications with the standard transit trunk 13 divided into two, one being for the X.25-system guaranteed band 13A and the other being for the frame relay guaranteed band 13B. Referring to FIG. 38, the node 17a includes the terminal trunk control unit 44, the flow control unit 45, the transit trunk control unit 46, and the transmission queue monitoring unit 58.

The transmission queue monitoring unit 58 monitors the X.25-system transmission queue 57A and the frame relay-system transmission queue 57B in the transit trunk control unit 46. The transmission queue monitoring unit 58 includes a table 58A used to vary the band according to the congestion status of each of the transmission queues 57A and 57B, as shown in FIG. 39.

In the table 58A, the bands are set according to the congestion status in three stages of each of the transmission queues 57A and 57B, as expressed by the following formulas (3) to (8).

| | | |
|---|---|---|
| X.25 status I: | $X1 \leq Y < X2$ | (3) |
| X.25 status II: | $X2 \leq Y < X3$ | (4) |
| X.25 status III: | $X3 \leq Y$ | (5) |
| Frame relay status I: | $S1 \leq Y < S2$ | (6) |
| Frame relay status II: | $S2 \leq Y < S3$ | (7) |
| Frame relay status III: | $S3 \leq Y$ | (8) | where Y (bytes) is the total length of the queues connected respectively to the transmission queues 57A and 57B, X1<X2<X3, and S1<S2<S3.

The terminal trunk control unit 44, the flow control unit 45, and the transmit trunk control unit 46 correspond functionally to those shown in FIG. 36, respectively.

Figure 40:
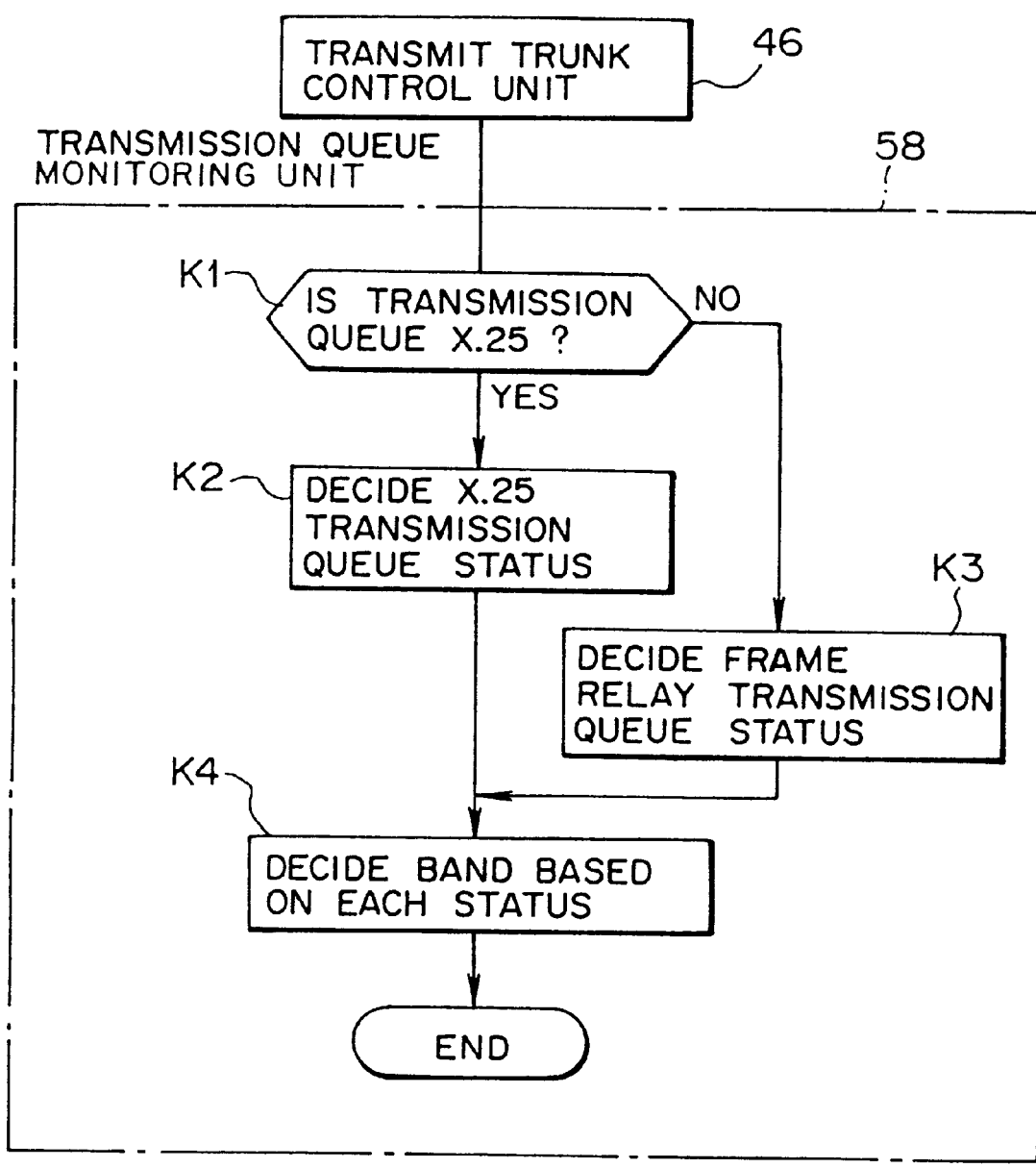
FIG. 40 is a flowchart used for explaining the operation of setting the band based on the congestion state of each transmission queue, according to the present embodiment.
Figure 41:
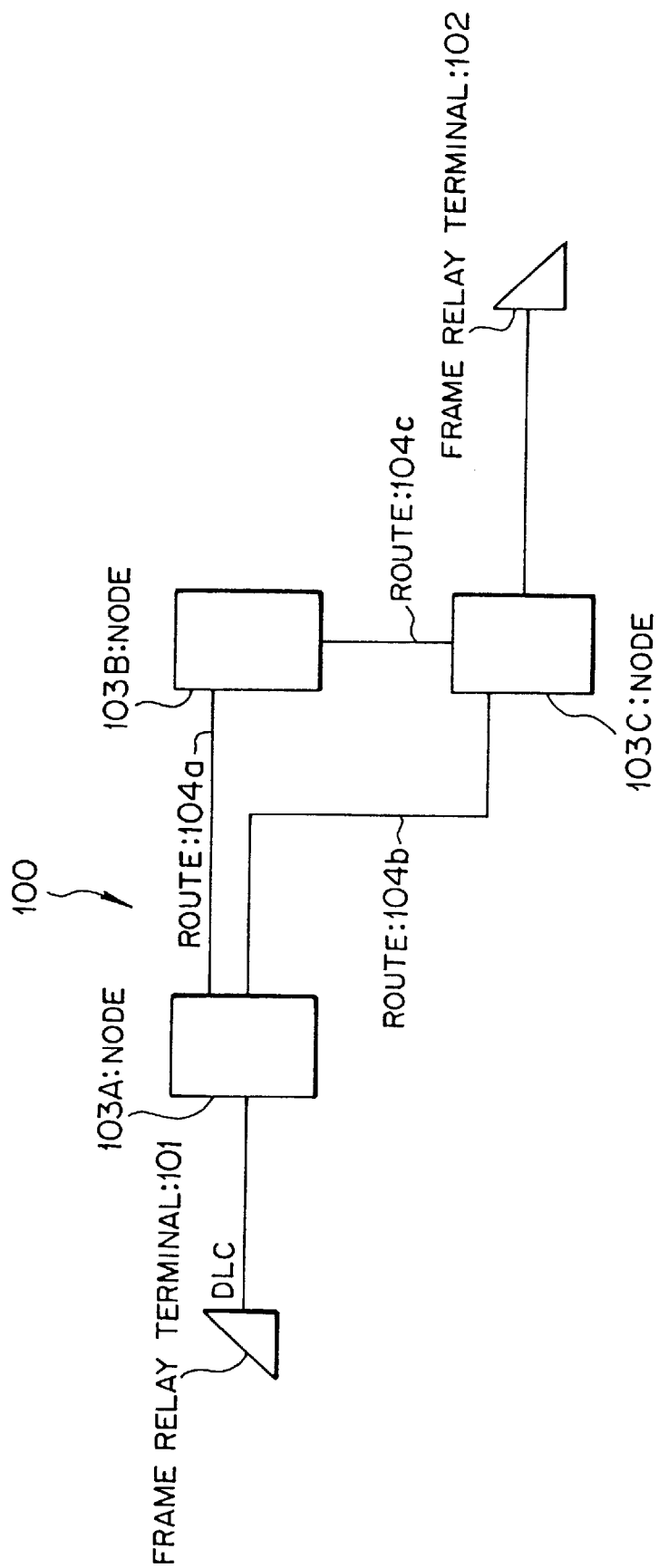
FIG. 41 is a diagram showing a frame relay network with a general alternate route.
Figure 43:
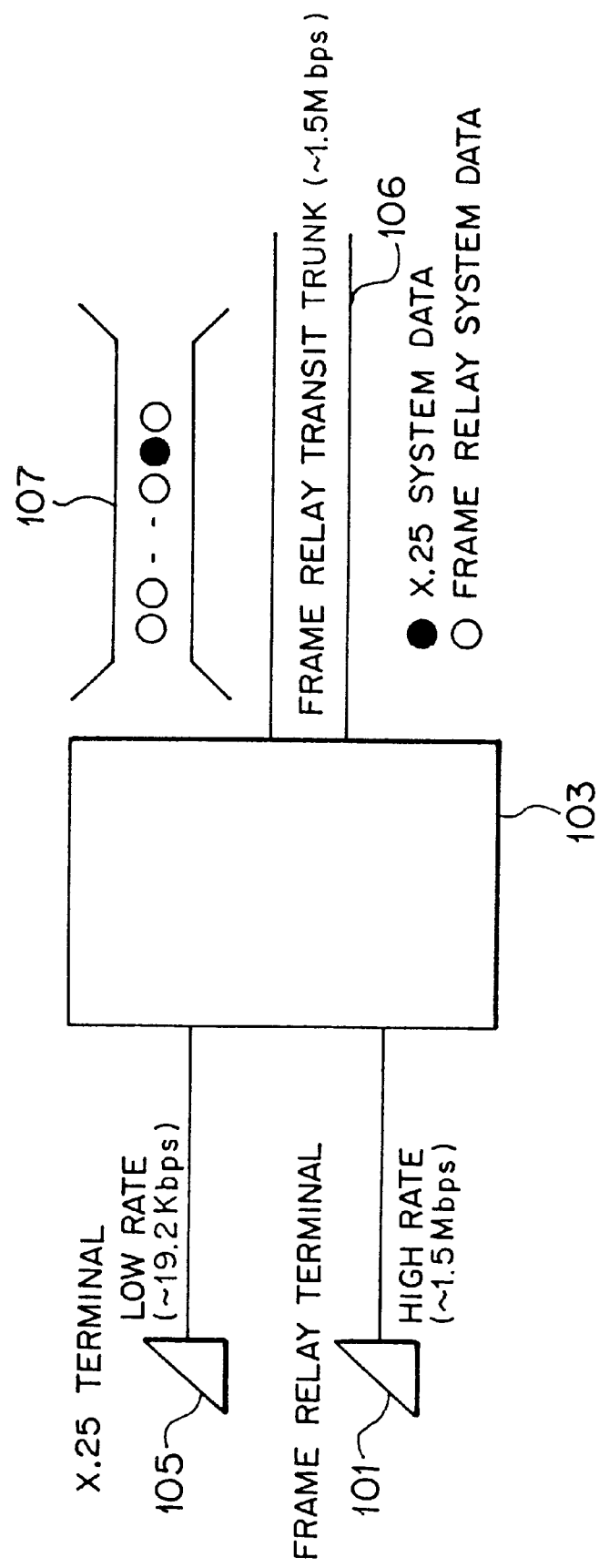
FIG. 43 is a diagram showing a general frame relay communication system.

In the node 17a according to the present embodiment, where communications is made with the standard transit trunks 13 divided into two, one being for the X.25-system guaranteed band 13A and the other being for the frame relay guaranteed band 13B, the band is set, based on the congestion status of each of transmission queues 57A and 57B as shown in the flowchart in FIG. 40.

That is, the transmission queue monitoring unit 58 monitors the X.25-system transmission queue 57A and the frame relay-system transmission queue 57B and applies the X.25-system transmission queue 57A to any one of the statuses I to III expressed by the formulas (3) to (5) (from step K1 to step K2 via YES route).

Furthermore, any one of the statuses I to III expressed by the above-mentioned formulas (6) to (8) is applied to the transmission queue 57B in the frame relay system (from step K1 to step K3 via NO route).

The band is decided by referring to the table 58A, based on the status decided in the steps K2 and k3 (step K4). Thereafter, like the case shown in FIG. 37, the frame transmission is performed based on the decided band.

As described above, there is an advantage in that since the communication band of the standard transit trunk 13 is decided according to the congestion status of each of the transmission queues 57A and 57B, congestion that occurs in both the X.25 system and frame relay communication system can be suppressed.

(n2) Second band changing processing mode in which communications is established with the standard transit trunk divided into the band of the packet system and the band of the frame relay system:

In the item (n1), the communication band of the standard transit trunk 13 is decided according to the congestion status of each of the transmission queues 57A and 57B. However, the communication band may be decided in the delayed stage of each of the transmission queues 57A and 57B, without being limited to only the above embodiment.

In this case, the transmission queue monitoring unit 58 can prepare a table used to vary the band according to the delayed stage of each of the transmission queues 57A and 57B, like the table shown in FIG. 39.

the delayed stage of each of the transmission queues 57A and 57B can be set according to the three delayed stages in each of the transmission queues 57A and 57B expressed by the following formulas (9) to (14).

| | | |
|---|---|---|
| X.25 status I: | $X1 \leq T < X2$ | (9) |
| X.25 status II: | $X2 \leq T < X3$ | (10) |
| X.25 status III: | $X3 \leq T$ | (11) |
| Frame relay status I: | $S1 \leq T < S2$ | (12) |
| Frame relay status II: | $S1 \leq T < S2$ | (13) |
| Frame relay status III: | $S1 \leq Y < S2$ | (14) | where T(s) is the total length of queues connected to each of the transmission queues 57A and 57B/speed of the transmission trunk rate, X1<X2<X3, and S1<S2<S3.

Therefore there is an advantage in that even if the communication band of the standard transit trunk 13 is decided according to the delayed stage of each of the transmission queues 57A and 57B, congestion which occurs in both of the X.25 system and the frame relay communication system can be suppressed as described in the item (n1).

What is claimed is:

1. A data exchange accommodating plural data terminals via terminal trunks and including transit trunk control means for transferring selectively data to be transferred from the terminal trunk to a standard transit line or a backup transit line, said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk;

said transit trunk control means having first alternate control means to transfer alternately data to be transferred using said backup transit line, based on detection information from said congestion status detecting means: and alternate priority setting means sets priority to data link identification information of every terminal trunk; and wherein said first alternate control means performs an alternate control to said backup transit line, based on the priority set by said alternate priority setting means.

2. The data exchange according to claim 1, wherein said plural data terminals are formed as at least one group; and wherein said alternate priority setting means sets the priority to data link identification information set every terminal trunk of said group.

3. The data exchange according to claim 2, wherein plural backup transit lines are connected; and wherein said transit trunk control means includes a second alternate control means for stepwise-bypassing data to be transferred with said standard transit line in use to said plural backup transit lines, based on detection information from said congestion state detecting means.

4. The data exchange according to claim 2, further comprising trunk use rate monitoring means for monitoring the trunk use rate; and wherein said plural backup transit lines are connected; and wherein said transit trunk control means includes;

second alternate control means for stepwise-bypassing data to be transferred with said standard transit line in use to said plural backup transit lines, based on detection information from said congestion status detecting means; and return transferring means for returning sequentially the trunk to the original standard transit line to transfer data, when said congestion status detecting means detects a release from the congestion status of said standard transit line, provided that the trunk use rate is smaller than a predetermined value, based on trunk use rate information from said trunk use rate monitoring means.

5. The data exchange according to claim 2, wherein said plural backup transit lines are connected; and wherein said transit trunk control means includes:

second alternate control means for stepwise-bypassing data to be transferred with said standard transit line in use to said plural backup transit lines, based on detection information from said congestion status detecting means; and committed information rate varying means for varying a committed information rate defined by a terminal trunk when it is judged that said standard transit line is almost in a congestion status, based on detection information from said congestion state detecting means.

6. The data exchange according to claim 2, further comprising trunk use rate monitoring means for monitoring a trunk use rate; and wherein said transit trunk control means includes return transferring means for returning sequentially the trunk to the original standard transit line to transfer data when said congestion status detecting means detects a release from the congestion status of said standard transit line, provided that the trunk use rate is smaller than a predetermined value, based on trunk use rate information from said trunk use rate monitoring means.

7. The data exchange according to claim 1, wherein plural backup transit lines are connected; and wherein said transit trunk control means includes a second alternate control means for stepwise-bypassing data to be transferred with said standard transit line in use to said plural backup transit lines, based on detection information from said congestion status detecting means.

8. The data exchange according to claim 1, further comprising trunk use rate monitoring means for monitoring the trunk use rate; and wherein said plural backup transit lines are connected; and wherein said transit trunk control means includes;

second alternate control means for stepwise-bypassing data to be transferred with said standard transit line in use to said plural backup transit lines, based on detection information from said congestion status detecting means; and return transferring means for returning sequentially the trunk to the original standard transit line to transfer data, when said congestion status detecting means detects a release from the congestion status of said standard transit line, provided that the trunk use rate is smaller than a predetermined value, based on trunk use rate information from said trunk use rate monitoring means.

9. The data exchange according to claim 1, wherein said plural backup transit lines are connected; and wherein said transit trunk control means includes:

second alternate control means for stepwise-bypassing data to be transferred with said standard transit line in use to said plural backup transit lines, based on detection information from said congestion status detecting means; and committed information rate varying means for varying a committed information rate defined by a terminal trunk when it is judged that said standard transit line is almost in a congestion status, based on detection information from said congestion state detecting means.

10. The data exchange according to claim 1, further comprising:

flow parameter setting means for setting a flow parameter used to perform a flow control in said transit system; and flow parameter reporting means for reporting said changed flow parameter to said variable-length data terminal when a flow parameter is changed by said flow parameter setting means.

11. The data exchange according to claim 2, further comprising trunk use rate monitoring means for monitoring a trunk use rate; and wherein said transit trunk control means includes return transferring means for returning sequentially the trunk to the original standard transit line to transfer data when said congestion status detecting means detects a release from the congestion status of said standard transit line, provided that the trunk use rate is smaller than a predetermined value, based on trunk use rate information from said trunk use rate monitoring means.

12. A data exchange accommodating plural data terminals via terminal trunks and including transit trunk control means for transferring selectively data to be transferred from the terminal trunk to a standard transit line or a backup transit line, said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk, said transit trunk control means having first alternate control means to transfer alternately data to be transferred using said backup transit line, based on detection information from said congestion status detecting means:

wherein plural backup transit lines are connected; and wherein said transit trunk control means includes second alternate control means for stepwise-bypassing data to be transferred with said standard transit line in use to said plural backup transit lines, based on detection information from said congestion status detecting means.

13. A data exchange accommodating plural data terminals via terminal trunks and including transit trunk control means for transferring selectively data to be transferred from the terminal trunk to a standard transit line or a backup transit line, said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk:

said transit trunk control means having first alternate control means to transfer alternately data to be transferred using said backup transit line, based on detection information from said congestion status detecting means;

trunk use rate monitoring means for monitoring the trunk use rate; and wherein said plural backup transit lines are connected; and wherein said transit trunk control means includes:

second alternate control means for stepwise-bypassing data to be transferred with said standard transit line in use to said plural backup transit lines, based on detection information from said congestion status detecting means; and return transferring means for returning sequentially the trunk to the original standard transit line to transfer data, when said congestion status detecting means detects a release from the congestion status of said standard transit line, provided that the trunk use rate is smaller than a predetermined value, based on trunk use rate information from said trunk use rate monitoring means.

14. A data exchange accommodating plural data terminals via terminal trunks and including transit trunk control means for transferring selectively data to be transferred from the terminal trunk to a standard transit line or a backup transit line, said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk;

said transit trunk control means having first alternate control means to transfer alternately data to be transferred using said backup transit line, based on detection information from said congestion status detecting means;

wherein said plural backup transit lines are connected; and wherein said transit trunk control means includes:

second alternate control means for stepwise-bypassing data to be transferred with said standard transit line in use to said plural backup transit lines, based on detection information from said congestion status detecting means; and committed information rate varying means for varying a committed information rate defined by a terminal trunk when it is judged that said standard transit line is almost in a congestion status, based on detection information from said congestion state detecting means.

15. A data exchange accommodating plural data terminals via terminal trunks and including plural standard transit lines transferring data to a predetermined transfer destination in a transit system, and a backup transit line for alternatively transferring data to said predetermined transfer destination, said data exchange comprising:

data link identification information setting means for setting data link identification information corresponding to data link identification information of every said terminal trunk, to said plural standard transit lines;

congestion status detecting means for detecting the congestion status in said standard transit line; and transit trunk control means for controlling to transfer data to be transferred from said terminal trunk using a standard transit line corresponding to data link identification information, and controlling to transfer data using a standard transit line to which another data link identification information is set when congestion occurring in said standard transit line is detected based on detection information from said congestion status detecting means.

16. The data exchange according to claim 15, further comprising trunk use rate monitoring means for monitoring a trunk use rate; and wherein said transit trunk control means includes return transferring means for returning sequentially the trunk to the original standard transit line to transfer data when said congestion status detecting means detects a release from the congestion status of said standard transit line, provided that the trunk use rate is smaller than a predetermined value, based on trunk use rate information from said trunk use rate monitoring means.

17. The data exchange according to claim 15, further comprising trunk use rate monitoring means for monitoring a trunk use rate; and wherein said transit trunk control means controls a data transfer using a standard transit line with the lowest trunk use rate, based on trunk use rate information from said trunk use rate monitoring means, when congestion occurring in said standard transit line is detected.

18. The data exchange according to claim 15, wherein communications are mad with said standard transit line separated into the band in a packet system and the band in a frame relay system.

19. The data exchange according to claim 18, further comprising:

transmission queue monitoring means for monitoring transmission queues in a packet system and a frame relay system; and band ratio varying means for varying the ratio of the band in said packet system and the band in said frame relay system, based on transmission queue monitoring information from said transmission queue monitoring means.

20. The data exchange according to claim 19, wherein said transmission queue monitoring information from said transmission queue monitoring means is information regarding a congestion of a transmission queue.

21. The data exchange according to claim 19, wherein said transmission queue monitoring information from said transmission queue monitoring means is information regarding a delay of a transmission queue.

22. A data exchange accommodating plural data terminals via terminal trunks and including transit trunk control means for transferring selectively data to be transferred from the terminal trunk to a standard transit line or a backup transit line, said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk;

said transit trunk control means having first alternate control means to transfer alternately data to be transferred using said backup transit line, based on detection information from said congestion status detecting means;

trunk use rate monitoring means for monitoring a trunk use rate; and wherein said transit trunk control means includes return transferring means for returning sequentially the trunk to the original standard transit line to transfer data when said congestion status detecting means detects a release from the congestion status of said standard transit line, provided that the trunk use rate is smaller than a predetermined value, based on trunk use rate information from said trunk use rate monitoring means.

23. A data exchange accommodating plural data terminals via terminal trunks and including transit trunk control means for transferring selectively data to be transferred from the terminal trunk to a standard transit line or a backup transit line said transit trunk control means connected to said standard transit line transferring data to a predetermined transfer destination in a transit system, and said backup transit line which transfers data alternately to the predetermined transfer destination, said data exchange comprising:

congestion status detecting means for detecting a congestion status in said standard transit trunk;

said transit trunk control means having first alternate control means to transfer alternately data to be transferred using said backup transit line, based on detection information from said congestion status detecting means:

wherein communications are made with said standard transit line separated into the band in a packet system and the band in a frame relay system.

24. The data exchange according to claim 23, further comprising:

transmission queue monitoring means for monitoring transmission queues in a packet system and a frame relay system; and band ratio varying means for varying the ratio of the band in said packet system and the band in said frame relay system, based on transmission queue monitoring information from said transmission queue monitoring means.

25. The data exchange according to claim 24, wherein said transmission queue monitoring information from said transmission queue monitoring means is information regarding a congestion of a transmission queue.

26. The data exchange according to claim 24, wherein said transmission queue monitoring information from said transmission queue monitoring means is information regarding a delay of a transmission queue.

27. A data terminal accommodated in a data exchange via a terminal trunk, said data terminal comprising:

a standard transit line for transferring data to a predetermined transfer destination in a transit system;

backup transit line for transferring data to be transferred with said standard transit line to said predetermined transfer destination by a roundabout route;

data link identification setting means for setting data link identification information corresponding to data link information of said terminal trunk, to said standard transit line and said backup transit line, transit trunk control means for transferring selectively data to be transferred from said terminal trunk via said standard transit line corresponding to data link information or via said backup transit line corresponding to another data link information when congestion occurs in said standard transit line;

flow parameter setting means for setting a flow parameter to perform a flow control in said transit system;

flow parameter reporting means for reporting a changed flow parameter to said variable-length data terminal when said flow parameter setting means changes said flow parameter; and flow control means for performing a flow control according to a flow parameter reported from said flow parameter reporting means.

28. A data communication system, comprising:

a transmitting data exchange accommodating a transmitting data terminal via a terminal trunk, for exchanging data; and a receiving data exchange accommodating a receiving data terminal via a terminal trunk, for exchanging data;

said transmitting exchange being connected to said receiving data exchange via a standard transit line for transferring data to a predetermined transfer destination in a transit system and a backup transit line for transferring data to be transferred with said standard transit line to said predetermined transfer destination by a roundabout route;

data link identification setting means for setting data link identification information corresponding to data link information of said terminal trunk, to said standard transit line and said backup transit line:

said transmitting data exchange including transit trunk control means for transferring selectively data to be transferred from said terminal trunk to said standard transit line corresponding to data link information or said backup transit line, corresponding to another data link information and congestion status detecting means for detecting the congestion status of said standard transit line;

said transit trunk control means including first alternate control means for controlling to transfer said data to be transferred by a roundabout route using said backup transit line, based on the detection information from said congestion status detecting means.

29. A data communicating method in which a transmitting data exchange accommodating a transmitting data terminal via a terminal trunk for exchanging data, and a receiving data exchange accommodating a receiving data terminal via said terminal trunk for exchanging data are prepared; said method comprises:

setting data link identification information corresponding to data link information of said terminal trunk, to said standard transit line and said backup transit line;

transferring data from said transmitting data exchange to said receiving data exchange, using a standard transit line being transferable data to a predetermined transfer destination in a transit system or a backup transit line transferring data to be transferred with said standard transit line to said predetermined transfer destination by a roundabout route; said transmitting data exchange selectively transfers data from said terminal trunk to said standard transit line corresponding to data link information or said backup transit line, corresponding to another data link information detecting the congestion status in said transit trunk, and transfers data to be transferred using said backup transit line, by a roundabout route, based on the detection information of the congestion status.

* * * * *